(12) United States Patent
Masunaga et al.

(10) Patent No.: US 6,909,699 B2
(45) Date of Patent: Jun. 21, 2005

(54) DATA TRANSFER SYSTEM, DATA TRANSFER MANAGEMENT APPARATUS AND DATA TRANSFER METHOD

(75) Inventors: Shinya Masunaga, Tokyo (JP); Yoshikatsu Niwa, Kanagawa (JP); Sumihiro Okawa, Kanagawa (JP)

(73) Assignee: Sony Corporation (JP)

( * ) Notice: Subject to any disclaimer, the term of this patent is extended or adjusted under 35 U.S.C. 154(b) by 873 days.

(21) Appl. No.: 09/884,686

(22) Filed: Jun. 19, 2001

(65) Prior Publication Data

US 2002/0105977 A1 Aug. 8, 2002

(30) Foreign Application Priority Data

Jun. 26, 2000 (JP) .......................... 2000-191469

(51) Int. Cl.⁷ .............................................. G01R 31/08
(52) U.S. Cl. ........................ 370/252; 370/257; 370/516; 370/517; 370/519
(58) Field of Search ................................ 370/252, 253, 370/254, 257, 400, 401, 402, 419, 516, 517, 519

(56) References Cited

U.S. PATENT DOCUMENTS 6,212,171 B1 * 4/2001 LaFollette et al. .......... 370/257
2002/0064185 A1 * 5/2002 Nakai et al. ................ 370/519

* cited by examiner

Primary Examiner—Phirin Sam
(74) Attorney, Agent, or Firm—Lerner, David, Littenberg, Krumholz & Mentlik, LLP

(57) ABSTRACT

A data transfer system makes more effective use of a band available for the data transfer. In data transfer systems having devices with a different delay time in sending back the data depending on the transfer rate of data, it is possible to make more effective use of the band available for the transfer by transferring predetermined data at a slowest transfer rate within the data transfer system.

6 Claims, 34 Drawing Sheets

| OFFSET | NAME | OPERATION |
|---|---|---|
| 000h | STATE_CLEAR | STATE AND CONTROL INFORMATION |
| 004h | STATE_SET | SETS STATE_CLEAR BIT |
| 008h | NODE_IDs | INDICATES 16-BIT NODE ID |
| 00Ch | RESET_START | STARTS COMMAND RESET |
| 018h-01Ch | SPLIT_TIMEOUT | SPECIFIES SPLIT TIMEOUT |
| 200h | CYCLE_TIME | CYCLE TIME |
| 210h | BUSY_TIMEOUT | SPECIFIES RETRY TIMEOUT |
| 21Ch | BUS_MANAGER | INDICATES BUS MANAGER ID |
| 220h | BANDWIDTH_AVAILABLE | INDICATES BANDWIDTH AVAILABLE FOR ISOCHRONOUS COMMUNICATION |
| 224h-228h | CHANNELS_AVAILABLE | INDICATES AVAILABLE STATE OF EACH CHANNEL |

FIG. 9

| 400h | 04h | crc_length | rom_crc_value |

Bus_Info_block

| 404h | "1394" | | |
| --- | --- | --- | --- |
| 408h | imc crc bmc reserved | cyc_clk_acc | max_rec | reserved |
| 40Ch | Company_ID | | Chip_ID_hi |
| 410h | Chip_ID_lo | | |

Root_directory

| 414h | root_length | CRC |
| --- | --- | --- |
| 418h | 03h | module_vendor_id |
| 41Ch | 0Ch | node_capabilities |
| 420h | 8Dh | node_unique_id offset |
| 424h | D1h | unit_directory offset |
| 428h : | Optional. | |

Unit_directory

| unit_directory_length | CRC |
| --- | --- |
| 12h | unit_spec_id |
| 13h | unit_sw_version |
| : | Optional. |

FIG. 11

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 12

| The General Subunit Identifier Descriptor ||
|---|---|
| address | contents |
| 00 00₁₆ | descriptor_length |
| 00 01₁₆ | |
| 00 02₁₆ | generation_ID |
| 00 03₁₆ | size_of_list_ID |
| 00 04₁₆ | size_of_object_ID |
| 00 05₁₆ | size_of_object_position |
| 00 06₁₆ | number_of_root_object_lists (n) |
| 00 07₁₆ | |
| 00 08₁₆ | root_object_list_id_0 |
| ⋮ | ⋮ |
| ⋮ | root_object_list_id_n−1 |
| ⋮ | subunit_dependent_length |
| ⋮ | subunit_dependent_information |
| ⋮ | manufacturer_dependent_length |
| ⋮ | manufacturer_dependent_information |

FIG. 16

| generation_ID values ||
|---|---|
| generation_ID | meaning |
| $00_{16}$ | Data structures and command sets as specified in the AV/C General Specification, version 3.0 |
| all others | reserved for future specification |

FIG. 17

| List ID Value Assignment Ranges ||
|---|---|
| range of values | list definition |
| $0000_{16} - 0FFF_{16}$ | reserved |
| $1000_{16} - 3FFF_{16}$ | subunit-type dependent |
| $4000_{16} - FFFF_{16}$ | reserved |
| $1\ 0000_{16}$ - max list ID value | subunit-type dependent |

FIG. 18

| AV/C control | tape recorder/player | | PLAY | FORWARD |
|---|---|---|---|---|
| CTS= 0000 | ctype= 0000 | subunit type= 00100 | id= 000 | opcode= C3h | operand= 75h |

FIG. 23A

| AV/C accepted | tape recorder/player | | PLAY | FORWARD |
|---|---|---|---|---|
| CTS= 0000 | response =1001 | subunit type= 00100 | id= 000 | opcode= C3h | operand= 75h |

FIG. 23B

| TRANSMISSION ARBITRATION SIGNAL A (Arb_A_Tx) | DRIVER | | REMARKS |
|---|---|---|---|
| | Strb_Tx | Strb_Enable | |
| Z | - | 0 | TPA DRIVER: INACTIVE |
| 0 | 0 | 1 | TPA DRIVER: ACTIVE, STROBE: LOW |
| 1 | 1 | 1 | TPA DRIVER: ACTIVE, STROBE: HIGH |

FIG. 25

| TRANSMISSION ARBITRATION SIGNAL B (Arb_B_Tx) | DRIVER | | REMARKS |
|---|---|---|---|
| | Data_Tx | Data_Enable | |
| Z | - | 0 | TPB DRIVER: INACTIVE |
| 0 | 0 | 1 | TPB DRIVER: ACTIVE, STROBE: LOW |
| 1 | 1 | 1 | TPB DRIVER: ACTIVE, STROBE: HIGH |

FIG. 26

| RECEIVED ARBITRATION COMPARISON VALUE (Arb_n_Rx)' | ARBITRATION RECEIVED FROM ITS PORT (Arb_n_Tx)' | INTERPOLATED ARBITRATION SIGNAL (Arb_n)' | REMARKS |
|---|---|---|---|
| | | | 'n=AorB THIS TABLE APPLIES TO BOTH A AND B. |
| Z | Z | Z | |
| 0 | Z | 0 | IF THIS PORT HAS TRANSMITTED Z, RECEIVED SIGNAL IS EQUIVALENT TO SIGNAL TRANSMITTED BY PORT AT OTHER END OF CABLE. |
| 1 | Z | 1 | |
| Z | 0 | 1 | IF COMPARATOR RECEIVES Z WHILE THIS PORT TRANSMITS 0, OTHER PORT TRANSMITS 1. |
| 0 | 0 | 0 | OTHER PORT TRANSMITS 0 OR Z. |
| Z | 1 | 1 | OTHER PORT TRANSMITS 0. |
| 1 | 1 | 1 | OTHER PORT TRANSMITS 1 OR Z. |

FIG. 27

| ARBITRATION TRANSMISSION | | LINE STATE NAME | REMARKS |
|---|---|---|---|
| (Arb_A_Tx) | (Arb_B_Tx) | | |
| Z | Z | IDLE | TRANSMITTED TO INDICATE GAP. |
| Z | 0 | TX_REQUEST | TRANSMITTED TO PARENT NODE TO REQUEST BUS. |
| | | TX_GRANT | TRANSMITTED TO CHILD NODE WHEN BUS IS GIVEN. |
| 0 | Z | TX_PARENT_NOTIFY | TRANSMITTED TO NODE OF PARENT CANDIDATE IN Tree_ID PHASE. |
| 0 | 1 | TX_DATA_PREFIX | TRANSMITTED BEFORE PACKET DATA OR BETWEEN PACKET DATA OF SUBACTION CONNECTED. |
| 1 | Z | TX_CHILD_NOTIFY | TRANSMITTED TO CHILD NODE TO ACKNOWLEDGE PARENT_NOTIFY. |
| | | TX_IDENT_DONE | TRANSMITTED TO PARENT NODE TO INDICATE THAT self_ID PHASE IS COMPLETED. |
| 1 | 0 | TX_DATA_END | TRANSMITTED AT END TIME OF PACKET TRANSFER. |
| 1 | 1 | BUS_RESET | TRANSMITTED TO RECONSTRUCT THE BUS. |

FIG. 28

| RECEPTION ARBITRATION SIGNAL | | LINE STATE NAME | REMARKS |
|---|---|---|---|
| (Arb_A_Rx) | (Arb_B_Tx) | | |
| Z | Z | IDLE | PHY OF ADJACENT NODE CONNECTED IS NOT IN OPERATION. |
| Z | 0 | RX_PARENT_NOTIFY | PHY OF ADJACENT NODE CONNECTED IS BECOMING CHILD NODE. |
| Z | 1 | RX_REQUEST_CANCEL | PHY OF ADJACENT NODE CONNECTED HAS ABANDONED REQUEST. |
| 0 | Z | RX_IDENT_DONE | PHY OF CHILD NODE HAS COMPLETED self_ID PHASE. |
| 0 | Z | RX_SELF_ID_GRANT | PHY OF PARENT NODE GIVES BUS FOR self_ID. |
| 0 | 0 | RX_REQUEST | PHY OF CHILD NODE REQUESTS BUS. |
| 0 | 0 | RX_ROOT_CONTENTION | PHYS OF CHILD NODE AND ADJACENT NODE CONNECTED ARE BOTH BECOMING CHILD NODE. |
| 0 | 1 | RX_GRANT | PHY OF PARENT NODE GIVES BUS CONTROL. |
| 1 | Z | RX_PARENT_HANDSHAKE | PHY OF ADJACENT NODE CONNECTED ACKNOWLEDGES PARENT_NOTIFY. |
| 1 | 0 | RX_DATA_END | PHY OF ADJACENT NODE CONNECTED ENDS TRANSMISSION OF DATA BLOCK AND RELEASES BUS. |
| 1 | 1 | RX_CHILD_HANDSAHKE | PHY OF ADJACENT NODE CONNECTED ACKNOWLEDGES TX_CHILD_NOTIFY. |
| 1 | 1 | RX_DATA_PREFIX | PHY OF ADJACENT NODE CONNECTED IS TRANSMITTING PACKET DATA OR FURTHER TRANSMITTING DATA AFTER END OF TRANSMITTING DATA BLOCK. |
| 1 | 1 | BUS_RESET | TRANSMITTED TO RECONSTRUCT BUS. |

FIG. 29

| TRANSMISSION SYMBOL | | ARBITRATION STATUS |
|---|---|---|
| 11111 | | IDEL |
| 00100 | | TX_REQUEST |
| | | TX_GRANT |
| 00101 | | TX_PARENT_NOTIFY |
| 11000 10001 | | TX_DATA_PREFIX |
| 00111 | | TX_CHILD_NOTIFY |
| | | TX_IDENT_DONE |
| 01101 | | TX_DATA_END |
| 00000 11111 | | BUS_RESET |

FIG. 31

| | | |
|---|---|---|
| 11111 | 11111 | IDLE |
| 00101 | 11111 | RX_PARENT_NOTIFY |
| 11111 | 00100 | RX_REQUEST_CANCEL |
| 00111 | 11111 | RX_IDENT_DONE |
| 00100 | 11111 | RX_SELF_ID_GRANT |
| 00100 | 11111 | RX_REQUEST |
| 00101 | 00101 | RX_ROOT_CONTENTION |
| 00100 | 00100 | RX_GRANT |
| 00111 | 00101 | RX_PARENT_HANDSHAKE |
| 01101 | 11111 | RX_DATA_END |
| 11111 | 00111 | RX_CHILD_HANDSHAKE |
| 11000 10001 | 00100 | RX_DATA_PREFIX |
| 11000 10001 | 00111 | RX_DATA_PREFIX |
| 11000 10001 | 11111 | RX_DATA_PREFIX |
| 00000 11111 | (do'nt care) | BUS_RESET |

FIG. 32

| HEXADECIMAL | BINARY | SYMBOL |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

FIG. 33

DATA TRANSFER SYSTEM, DATA TRANSFER MANAGEMENT APPARATUS AND DATA TRANSFER METHOD

CROSS-REFERENCE TO RELATED APPLICATIONS

The present application claims priority from Japanese Application No. P2000-191469 filed Jun. 26, 2000, the disclosure of which is hereby incorporated by reference herein.

BACKGROUND OF THE INVENTION

The present invention relates to a data transfer system, a data transfer management apparatus and a data transfer method, and more particularly to a data transfer system capable of making more effective use of the transfer band of data.

The IEEE 1394 high performance serial bus standards (hereinafter referred to as the IEEE 1394 standards) have been developed as the bus standards for transferring multimedia data in real time and at high rate.

In the IEEE 1394 standards, three data transfer modes, called S100 (98.304 Mbps), S200 (196.608 Mbps) and S400 (393.216 Mbps), are defined, a 1394 port having an upper transfer rate being provided to keep inconsistency with its lower transfer rate. Thereby, the data transfer rates of S100, S200 and S400 can be mixed on the same network. In the IEEE standards, a so-called DS-Link (Data/Strobe Link) encoding method is employed as the transfer format.

In the DS-Link encoding method, the transfer data is transformed into a data signal and a strobe signal for supplementing the data signal, in which a clock can be generated by taking an exclusive-OR of these two signals, as shown in FIG. 1.

Further, a cable 1 has a structure in which two twisted pairs (signal conductors) 3 shielded by a first shield layer 2 around its cross-section and a power wire 4 are bundled together and entirely shielded by a second shield layer 5, as shown in FIG. 2.

In the IEEE 1394 standards, there are provided two connection methods, namely, daisy chain and node branch. A daisy chain method is capable of connecting up to 16 hops of 1394 node, with the maximum distance between each node being 4.5 m. In the IEEE 1394 standards, up to 63 nodes can be connected by employing both methods of daisy chain and node branch in combination.

In the IEEE 1394 standards, the cable can be taken out or put in or the power turned on or off in the above connected state, while the other node is in operation. A 1394 topology is automatically reconstructed when a node is added or deleted. The ID or arrangement of the connected node is managed on the interface.

The components of the interface and the protocol architecture conforming to the IEEE 1394 standards are configured as shown in FIG. 3. Herein, the interface of the IEEE 1394 standards can be divided into three sections of hardware, firmware and software.

The hardware comprises a physical layer (PHY layer) and a link layer. In the physical layer, the signal of the IEEE 1394 standards is directly driven. The link layer has a host interface and an interface with the physical layer.

The firmware comprises a transaction layer consisting of a management driver for performing actual operations for the interface conforming to the IEEE 1394 standards, and a management layer consisting of a management driver conforming to the IEEE 1394 standards called a serial bus management (SBM).

The software is mainly an application layer, comprising a program employed by the user and a management program for providing the interface with the transaction layer or management layer.

In the IEEE 1394 standards, the transfer operation that occurs within a network is called a sub-action. For this sub-action, there are defined two transfer modes: an asynchronous transfer mode called asynchronous and a synchronous transfer mode called isochronous in which the transfer band is assured. Further, each sub-action can take any of three transfer states that are referred to as arbitration, packet transmission and acknowledgement. In the isochronous mode, the acknowledgement is omitted.

In an asynchronous sub-action, asynchronous transfer is made. FIG. 4 shows the transition state over time in this transfer mode. A first sub-action gap indicates an idle state of the bus. The termination of prior transfer can be detected by monitoring the time of this sub-action gap, and it is determined whether or not a new transfer is permitted. Herein, if the idle state continues for a certain time or more, the nodes C and D desiring the transfer determine that the bus is available, and send a request for the control right of the bus to a parent node, as shown in FIGS. 5A and 5B.

The parent node B that has accepted the transfer request from node C sends a data prefix for rejecting the control right of the bus to the ports other than the port having accepted the request, and repeats the request for the parent node A of its own. The root node A sends a grant for permitting the control right of the bus for the request accepted firstly and sends the data prefix to other ports.

All the nodes that have accepted the data prefix withdraw the request, and are placed in a data waiting state. One node can get the control right of the bus at any time by determining the control right of the bus in accordance with this procedure, thereby avoiding collision of the data.

The node that has acquired the control right of the bus in this arbitration executes the data transfer, or the packet transmission, following the data prefix. A target node that has received the transferred data responds by executing the acknowledgment of sending back ACK (reception acknowledge return code) in accordance with the received result.

By executing this acknowledgment, the transmission and reception nodes can confirm whether or not the data transfer has been performed normally, and may perform the retransmission of data in some cases. Afterwards, the nodes return to the sub-action gap or the idle state of the bus to repeat the above transfer operation.

In an isochronous sub-action, the data transfer is made fundamentally according to the same procedure as in the asynchronous sub-action, but preferentially is performed prior to the asynchronous transfer with the asynchronous sub-action. A packet for the isochronous transfer is shown in FIG. 18. The isochronous transfer in this isochronous sub-action is effected following a cycle start packet issued from the root node at about every 8 kHz. Thereby the node is placed in the transfer mode in which the transfer band is assured to implement the transfer of data in real time.

In the case where the isochronous transfer of real time data is performed among a plurality of nodes at the same time, the required real time data is received only by setting a channel ID for distinguishing the data in its transfer data.

FIG. 7 is a diagram showing the transmission cycle structure in which the asynchronous transfer with the asynchronous sub-action and the synchronous transfer with the isochronous transmission are mixed. In the IEEE 1394, the data is divided into packets and transmitted in time division with reference to a cycle having a length of 125 μS. This cycle is produced by a cycle start signal supplied from a node (any device connected to the bus) having a cycle master function. The isochronous packet secures a band (in unit of time but called a band) required for transmission from the beginning of all the cycles. Therefore, in isochronous transmission, the transmission of data within a fixed time is assured. If a transmission error occurs, the data is lost because there is no protection scheme. In asynchronous transmission in which a node having gotten the bus as a result of arbitration sends out an asynchronous packet within the time of each cycle not used for isochronous transmission, secure transmission can be assured by employing the acknowledge and retry, but the transmission timing is not fixed.

In order for a predetermined node to effect isochronous transmission, it is required that that node can cope with the isochronous function. At least one of the nodes coping with the isochronous function must have a cycle master function. Further, at least one of the nodes connected to the IEEE 1394 serial bus must have an isochronous resource manager function.

The IEEE 1394 conforms to a control & status register (CSR) architecture having an address space of 64 bits as defined in the ISO/IEC 13213. FIG. 8 is a diagram for explaining the structure of the address space in the CSR architecture. The first 16 bits indicate a node ID designating the node on the IEEE 1394, and the remaining 48 bits are employed to designate the address space given to each node. The first 16 bits are further divided into 10 bits of bus ID and 6 bits of physical ID (node ID in a narrow sense). Since the value in which all bits are one is used for a special purpose, 1023 buses and 63 nodes can be designated.

A space defined by the first 20 bits in the address space of 256 terabytes defined by the remaining 48 bits is divided into an Initial Register Space, a Private Space and an Initial Memory Space which are used for the registers specific to the CSR or specific to the IEEE 1394 of 2048 bytes. In the case where the space defined by these first 20 bits is the Initial Register Space, the space defined by the remaining 28 bits is divided into a Configuration Read Only Memory, an Initial Unit Space used for purposes specific to the node, and a Plug Control Register (PCRs).

FIG. 9 is a table listing the offset address, name and operation of the main CSRs. In FIG. 9, an offset indicates the offset address from FFFFF0000000h (the last number with h indicates the hexadecimal notation) at which the Initial Register Space begins. A Bandwidth Available Register having an offset of 220h indicates a band that can be allocated to isochronous communication, the value of the node operating as the isochronous resource manager being only validated. The CSR of FIG. 8 has each node, but the Bandwidth Available Register is validated only for the isochronous resource manager. In other words, only the isochronous resource manager substantially has a Bandwidth Available Register. The Bandwidth Available Register saves the maximum value when no band is assigned for isochronous communication, the value being decreased every time the band is assigned.

A Channel Available Register with an offset from 224h to 228h has each bit corresponding to a channel number from 0 to 63. When the bit is zero, it indicates that the channel is already allocated. The Channel Available Register of only the node operating as the isochronous resource manager is effective.

Turning back to FIG. 8, the configuration ROM based on a general read only memory (ROM) format is arranged at the addresses from 200h to 400h in the Initial Register Space. FIG. 10 is a diagram showing the general ROM format. The node in unit of access on the IEEE 1394 can have a plurality of units operating independently while sharing the address space in the node. The unit directories can indicate the version or location of software for these units. Though a bus info block and a root directory are at fixed locations, other blocks are at the locations specified by the offset address.

FIG. 11 is a diagram showing the details of the bus info block, the root directory and the unit directory. Company ID within the bus info block stores the ID number indicating the manufacturer of the device. Chip ID stores an ID specific to the device and unique in the world without duplication with the Ids of other devices. Also, in accordance with the IEC 61833 standards, a unit spec ID in the unit directory of the device satisfying the IEC 61883 standards is written as 00h in the first octet, A0h in the second octet, and 2Bh in the third octet. Moreover, a unit switch version is written as 01h in the first octet, and 1 at the least significant bit (ISB) in the third octet.

In order to control the input/output of the device via the interface, the node has a plug control register (PCR), as defined in the IEC 61883, in the addresses from 900h to 9FFh within the Initial Unit Space of FIG. 8. This substantiates a concept of plug to form a signal path logically analogous to the analog interface. FIG. 12 is a diagram showing the configuration of the PCR. The PCR has an output plug control register (oPCR) indicating the output plug and an iPCR (input Plug Control Register) indicating the input plug. Also, the PCR has an output master plug register (oMPR) and an input master plug register (iMPR) indicating the information of the output plug or input plug specific to each device. Each device does not have plural oMPRS and iMPRS, but can have plural oPCRS and iPCRS corresponding to individual plugs in accordance with the capability of the device. The PCR as shown in FIG. 12 has 31 oPCRs and iPCRs. The flow of isochronous data is controlled by manipulating the registers corresponding to these plugs.

FIGS. 13A to 13D are diagrams showing the configuration of an oMPR, oPCR, iMPR and iPCR. FIG. 13A shows the configuration of an oMPR, FIG. 13B shows the configuration of an oPCR, FIG. 13C shows the configuration of an iMPR, and FIG. 13D shows the configuration of an iPCR. A data rate capability of 2 bits on the MSB side of the oMPR and the iMPR stores a code indicating the maximum transmission rate of isochronous data that the device can transmit or receive. A broadcast channel base of the oMPR specifies the number of channels used for the broadcast output.

A number of output plugs of 5 bits on the LSB side of the oMPR stores the number of output plugs or the number of oPCRs provided for the device. A number of input plugs of 5 bits on the LSB side of the iMPR stores the number of input plugs or the number of iPCRs provided for the device. A non-persistent extension field and a persistent extension field are areas reserved for future extension.

An on-line field of MSB for the oPCR and the iPCR indicates the use status of the plug. That is, if this value is 1, the plug is ON-LINE, and if this value is 0, the plug is OFF-LINE. The value of a broadcast connection counter for the oPCR and the iPCR denotes the presence (1) or absence (0) of a broadcast connection. The value of a point-to-point connection counter having a width of 6 bits for the oPCR and the iPCR denotes the number of point-to-point connections provided for the plug.

The value of a channel number having a width of 6 bits for the oPCR and the iPCR denotes the number of isochronous channels to which the plug is connected. The value of a data rate having a width of 2 bits for the PCR denotes the actual transmission rate of packets of isochronous data output from the plug. The code stored in an overhead ID having a width of 4 bits for the oPCR denotes the bandwidth of overhead in the isochronous communication. The value of a payload having a width of 10 bits for the PCR denotes the maximum value of data contained in an isochronous packet that the plug can handle.

FIG. 14 is a diagram showing the relation between plug control registers and isochronous channels. The AV-devices 71 to 73 are connected via an IEEE 1394 serial bus. Of oPCR[0] to oPCR[2] for which the transmission rate and the number of oPCRs are specified by the oMPR of an AV device 73, isochronous data having the channel specified by oPCR[1] is forwarded to the channel #1 of the IEEE 1394 serial bus. Of iPCR[0] and iPCR[1] for which the transmission rate and the number of iPCRs are specified by the iMPR of an AV device 71, the AV device 71 reads the isochronous data forwarded to the input channel #1 of the IEEE 1394 serial bus, the input channel designated by iPCR[0]. Similarly, an AV device 72 forwards isochronous data to the channel #2 designated by oPCR[0] and the AV device 71 reads the isochronous data from the channel #2 designated by iPRC[1].

In this way, data transmission is made between the devices connected via the IEEE 1394 serial bus. In this system, each device can be controlled or judged for the status, employing an AV/C command set that is defined as the commands for controlling the devices connected via the IEEE 1394 serial bus. This AV/C command set will be described below.

Referring now to FIGS. 15 to 19, the data structure of the Subunit Identifier Descriptor in the AV/C command set for use with this system will be described first. FIG. 15 shows the data structure of the Subunit Identifier Descriptor. As shown in FIG. 15, this data structure is formed by a list of hierarchical structure of the Subunit Identifier Descriptor. The list represents the channels that can be received by a tuner, or the music recorded on a disk, for example. The uppermost level list in the hierarchical structure is referred to as a root list, and a list 0 is the root list for the lower level lists, for example. The lists 2 to (n−1) become likewise the root list. The root lists exist by the number of objects. Herein, an object is each channel in the digital broadcast when the AV device is a tuner, for example. All the lists in one hierarchy share the common information.

FIG. 16 shows the format of The General Subunit Identifier Descriptor for use with the existing system. In the Subunit Identifier Descriptor, the attribute information regarding the function is described in the contents. The value of a descriptor length field itself is not contained. A generation ID indicates the version of the AV/C command set, its value being "00h" (h indicates hexadecimal) at present, as shown in FIG. 8. Herein, "00h" means that the data structure and the command are at the version 3.0 of the AV/C General Specification. As shown in FIG. 17, all the values except for "00h" are reserved for future specification.

A size of list ID denotes the number of bytes for the list ID. A size of object ID denotes the number of bytes for the object ID. A size of object position denotes the location (number of bytes) in the list for use to be referenced in the control. A number of root object lists denotes the number of root object lists. A root object list id indicates the ID for identifying the root object list at the uppermost level in the independent hierarchy.

A subunit dependent length denotes the number of bytes in the subsequent subunit dependent information field. The subunit dependent information field stores information specific to the function. The manufacturer dependent length denotes the number of bytes in the subsequent manufacturer dependent information field. The manufacturer dependent information field indicates the specification information of the vendor (maker). In the case where there is no manufacturer dependent information in the descriptor, this field does not exist.

FIG. 18 shows the assignment ranges of the list ID as shown in FIG. 16. The areas of "0000h to 0FFFh" and "4000h to FFFFh" are reserved as the assignment range for future specification. The areas of "1000h to 3FFFh" and "10000h to max list ID value" are prepared to identify the dependent information of the subunit type.

The AV/C command set for use with this system will be described below.

FIG. 19 is a view for explaining the command and response of FCP in the AV/C command set. The FCP is a protocol for controlling the AV devices on the IEEE 1394 bus. As shown in FIG. 19, the controlling side is a controller, and the controlled side is a target. The transmission or response of FCP commands is made between the nodes, employing a write transaction of the asynchronous communication on the IEEE 1394 bus. The target having received the data sends back the acknowledge to the controller to acknowledge reception.

FIG. 20 is a diagram for explaining in more detail the relation between the command and response of FCP as shown in FIG. 19. A node A and a node B are connected via the IEEE 1394 bus. The node A is a controller and the node B is a target. The node A and the node B have a command register and a response register each of which is 512 bytes. As shown in FIG. 20, the controller writes a command message in the command register 93 of the target to pass an instruction. The target writes a response message in the response register 92 of the controller to pass a response. For the above two messages, the control information is transmitted and received. The sorts of command sets transmitted with the FCP are described in the CTS in the data field of FIG. 21, as will be described later.

FIG. 21 shows the data structure of packets transmitted in an asynchronous transfer mode of the AV/C command. The AV/C command set is for controlling the AV devices, with CTS (command set ID)="0000". An AV/C command frame and a response frame are transmitted and received between the nodes using the above-described FCP. The response to the command must be effected within 100 ms not to have a burden on the bus and the AV device. As shown in FIG. 21, the asynchronous packet data is composed of 32 bits (=1 quadlet) in the horizontal direction. The upper stage in the figure indicates a header part of the packet, and the lower stage indicates a data block. A destination_ID denotes the destination.

The CTS indicates the command set ID, with CTS= "0000" in the AV/C command set. A ctype/response field denotes the functional classification of the command when the packet is the command, or the processed result of the command when the packet is the response. For the commands, four classes are defined: (1) command (CONTROL) for controlling the function from the outside, (2) command (STATUS) for inquiring as to the status from the outside, (3) command (GENERAL INQUIRY (opcode supported or not) and SPECIFIC INQUIRY (opcode and operands supported or not)) for inquiring as to the support of control command from the outside, and (4) command (NOTIFY) for notifying the change of status to the outside.

The response is sent back in accordance with the sort of command. The responses for the CONTROL command include NOT IMPLEMENTED, ACCEPTED, REJECTED and INTERIM. The responses for the STATUS command include NOT IMPLEMENTED, REJECTED, IN TRANSITION and STABLE. The responses for the GENERAL INQUIRY and SPECIFIC INQUIRY commands include IMPLEMENTED and NOT IMPLEMENTED. The responses for the NOTIFY command include NOT IMPLEMENTED, REJECTED, INTERIM and CHANGED.

A subunit type is provided to specify the function within the device, for example, to assign tape recorder/player, tuner and so on. In order to discriminate the cases where there are plural subunits of the same type, the subunit id as the discrimination number is used for addressing. An opcode indicates the command and an operand indicates the parameter of the command. An Additional operand field as well as a padding are provided if necessary. A data CRC (Cyclic Redundancy Check) is employed for error check in the data transmission.

FIG. 22 shows a specific example of the AV/C command. FIG. 22A shows a specific example of a ctype/response. The upper stage in the figure denotes the command, and the lower stage denotes the response. "0000" is assigned to CONTROL; "0001" is assigned to STATUS; "0010" is assigned to SPECIFIC INQUIRY; "0011" is assigned to NOTIFY; and "0100" is assigned to GENERAL INQUIRY. The area from "0101 to 0111" is reserved for future specification. "1000" is assigned to NOT IMPLEMENTED; "1001" is assigned to ACCEPTED; "1010" is assigned to REJECTED; "1011" is assigned to IN TRANSITION; "1100" is assigned to IMPLEMENTED/STABLE; "1101" is assigned to CHANGED; and "1111" is assigned to INTERIM. "1110" is reserved for future specification.

FIG. 22B shows a specific example of a subunit type. "00000" is assigned to Video Monitor; "00011" is assigned to Disk recorder/Player; "00100" is assigned to Tape recorder/Player; "00101" is assigned to Tuner; "00111" is assigned to Video Camera; "11100" is assigned to Vendor unique; and "11110" is assigned to Subunit type extended to next byte. "11111" is assigned to unit, which is employed when the AV/C command is transmitted to the device itself, for example, the power source being turned on or off.

FIG. 22C shows a specific example of an opcode. An opcode table exists for each subunit type, and an opcode is shown in a case where the subunit type is Tape recorder/Player. Also, an operand is defined for each opcode. Herein, "00h" is assigned to VENDOR-DEPENDENT; "50h" is assigned to SEARCH MODE; "51h" is assigned to TIME-CODE; "52h" is assigned to ATN; "60h" is assigned to OPEN MIC; "61h" is assigned to READ MIC; "62h" is assigned to WRITE MIC; "C1h" is assigned to LOAD MEDIUM; "C2h" is assigned to RECORD; "C3h" is assigned to PLAY; and "C4h" is assigned to WIND.

FIG. 23 shows a specific example of the AV/C command and the response. For example, when a reproduction or play instruction is issued to the reproducing device as the target (consumer), the controller sends a command to the target, as shown in FIG. 23A. Since this command uses the AV/C command set, CTS="0000". ctype="0000" because a command (CONTROL) for controlling the device from the outside is employed (see FIG. 22A). Since subunit type is Tape recorder/Player, subunit type="00100" (see FIG. 22B). Since id is ID0, id=000. opcode="C3h", which means PLAY (see FIG. 22C). operand is "75h" meaning FORWARD. If reproduced, the target sends back a response to the controller as shown in FIG. 23B. Herein, response="1001" meaning ACCEPTED (see FIG. 22A). Other items are the same as in FIG. 23A, except for response, and not described here.

The physical layer in the IEEE 1394 standards has a physical layer logical block (PHY Logic) 11, a selector block (RXLOCK/DATASELECTOR) 12, port logical blocks (PORT LOGIC1, PORT LOGIC2, PORT LOGIC3) 13, 14 and 15, cable ports (CABLE PORT1, CABLE PORT2, CABLE PORT3) 16, 17 and 18, and a clock generation block (PLL) 19, as shown in FIG. 24.

In this example, though the functions have been thus described using a physical layer having three ports, these functions do not depend on the number of ports.

The physical layer logical block 11 performs the I/O control and the arbitration control with the link layer in the IEEE 1394 standards, and is connected to a link layer controller (LINK CONTROLLER) 10, as well as the selector block 12 and the port logical blocks 13, 14 and 15.

The selector block 12 selects the data DATA1, DATA2 and DATA3 received via the port logical blocks 13, 14 and 15 connected to the cable ports 16, 17 and 18, and the reception clocks RXCLK1, RXCLK2 and RXCLK3, and is connected to the physical layer logical block 11 and the port logical blocks 13, 14 and 15.

In the case of data transfer, this selector block 12 transfers the packet data passed from the physical layer logical block 11 to all the port logical blocks 13, 14 and 15. Also, in the case of reception, the selector block 12 selects one pair among the packet data DATA1, DATA2 and DATA3 received via the port logical blocks 13, 14 and 15 and the reception clocks RXCLK1, RXCLK2 and RXCLK3, and sends the packet data DATA1 and its reception clock RXCLK1 received via the cable port 16 by the port logical block 13, for example, to the physical layer logical block 11.

The packet data selected by the selector block 12, for example, the packet data DATA1 received by the port logical block 13, is written into an FIFO memory within the physical layer logical block 11 at its reception clock RXCLK1. The packet data written into this FIFO memory is read at a system clock SYSCLK given by the clock generation block 19.

The port logical block 13 transmits or receives the arbitration signal ARB1 and the data DATA1 via the cable port 16 and has a function of generating a reception clock RXCLK1 from the data and its strobe signal sent via the cable port 16. Also, this port logical block 13 has the arbitration signal ARB1 passed from the physical layer logical block 11 at the time of arbitration. And at the time of receiving the data, the port logical block 13 sends the packet data DATA1 received via the cable port 16, together with its reception clock RXCLK1, via the selector block 12 to the physical layer logical block 11.

And, in the case where this port logical block 13 is selected by the selector block 12, the packet data DATA1 is written into the FIFO memory within the physical layer logical block 11 at its reception clock RXCLK1.

The port logical block 14 transmits or receives an arbitration signal ARB2 and the data DATA2 via the cable port 17 and has a function of generating a reception clock RXCLK2 from the data and its strobe signal sent via the cable port 17. Also, this port logical block 14 has the arbitration signal ARB2 passed from the physical layer logical block 11 at the time of arbitration.

And, at the time of receiving the data, the port logical block 14 sends the packet data DATA2 received via the cable port 17, together with its reception clock RXCLK2, via the selector block 12 to the physical layer logical block 11. In the case where this port logical block 14 is selected by the selector block 12, the packet data DATA2 is written into the FIFO memory within the physical layer logical block 11 at its reception clock RXCLK2.

The port logical block 15 transmits or receives an arbitration signal ARB3 and the data DATA3 via the cable port 18 and has a function of generating a reception clock RXCLK3 from the data and its strobe signal sent via the cable port 18. Also, this port logical block 15 has the arbitration signal ARB3 passed from the physical layer logical block 11 at the time of arbitration. And at the time of receiving the data, the port logical blocks 15 sends the packet data DATA3 received via the cable port 18, together with its reception clock RXCLK3, via the selector block 12 to the physical layer logical block 11.

In the case where this port logical block 15 is selected by the selector block 12, the packet data DATA3 is written into the FIFO memory within the physical layer logical block 11 at its reception clock RXCLK3.

The cable port 16 drives the twisted pair cable by a signal sent from the port logical block 13, and level-converts and sends a signal passed via the twisted pair cable to the port logical block 13. The cable port 17 drives the twisted pair cable by a signal sent from the port logical block 14, and level-converts and sends a signal passed via the twisted pair cable to the port logical block 14. The cable port 18 drives the twisted pair cable by a signal sent from the port logical block 15, and level-converts and sends a signal passed via the twisted pair cable to the port logical block 15.

The clock generation block 19 generates a system clock SYSCLK of 49.152 MHz and a transmission clock of 98.304 MHz (S100) from the clock of 24.576 MHz supplied from a crystal oscillator (X'TAL) 20.

The logical value of the arbitration signal in the physical layer is any one of three values "0", "1" and "Z", produced in accordance with the rules shown in FIGS. 25 and 26, and decoded in accordance with the rules shown in FIG. 27. The value "Z" indicates a passive state of driver.

Herein, of two twisted pairs, one twisted pair TPA/TPA* passes a strobe signal (Strb_Tx), and accepts a data signal (Data_Rx). On the other hand, another twisted pair TPA/TPA* passes a data signal (Data_Tx) and accepts a strobe signal (Strb_Rx). The signals Strb_Tx, Data_Tx, Strb_Enable and Data_Enable are used to generate the arbitration signals (Arb_A_Rx, Arb_B_Rx).

In the physical layer, two transmission arbitration signals Arb_A_Tx and Arb_B_Tx are encoded into the line status in accordance with the rules as shown in FIG. 28. The line status has a different meaning, depending on whether the signal is sent to the parent node or the child node, as shown in FIG. 28.

Herein, the relation between parent and child in the IEEE 1394 standards will be described below. Of a plurality of nodes connected in accordance with the IEEE 1394 standards, some nodes are located at a leaf (end). Immediately after the bus reset, each node determines whether or not it is located at a leaf. A determination of whether or not each node is at a leaf can be effected by recognizing how many cables are connected to itself.

That is, a node having only one port or a plurality of ports but with only one cable connected becomes a leaf. Each leaf makes an inquiry to the parent node to be connected. The parent node accepting the inquiry that the node connected to the port from which the inquiry originates is made a child node and further makes an inquiry to the connection destination from the port having the parent-child relation undecided. In this way, the parent-child relation within the bus is decided. Ultimately, the node that is parent for all the ports of its own becomes the root. Also, in the physical layer, the interpolation arbitration signals Arb_A_Tx and Arb_B_Tx are decoded into the line status in accordance with the rules shown in FIG. 29.

In the IEEE 1394 standards, there are required conditions for the interface connecting a home appliance handling video data to a computer, enabling a home network to be constructed by connecting through one cable a variety of devices including an audio device, a visual device and a personal computer in the general home, whereby the variety of devices can be simply operated.

However, in the IEEE 1394 standards, because the distance between devices to be connected or the internodal cable length is defined to be 4.5 m at maximum, several nodes must be provided only for the junction of cables, if a network over a plurality of rooms in a home is constructed.

If the cable length is extended without changing the physical layer method in the IEEE 1394 standards, the cable must be thicker, resulting in not only reduced workability for leading the cable for the network, but also expensive cables.

In order to avoid such a problem, a digital serial interface device (LD1394: Long Distance IEEE1394) has been proposed in which a digital serial data interface has an extension of internodal cable to make arbitration for the control right of the bus prior to the data transfer to effect long distance as in the IEEE 1394 standards.

By the way, in the LD 1394, it typically takes more time to make negotiation, owing to an increased cable delay caused by the long distance, than in the IEEE 1394 standards. Hence, there is a problem that the band usable for the data transfer is limited. Therefore, an attempt to make effective use of the band by optimizing the gap count in the topology containing the LD 1394 is considered to be important.

However, in the IEEE 1394 standards, it is specified that the PHY packet must be transferred at a rate of S100, and in the p1394a that is an extended specification of the IEEE 1394 standards, a ping packet defined as one of the PHY packets must be transferred at a rate of S100 at any time. Accordingly, the internodal propagation time that is obtained employing the ping packet is the propagation time between nodes when the data is transferred at a transfer rate of S100.

However, in the IEEE 1394 standards, because the topology of devices can be constructed relatively freely, it is sufficiently considered that the topology may contain in its path the physical layer with a different PHY delay in repeating the data depending on the transfer rate of data as seen in the physical layer of the LD 1394.

In such a topology, considering the case that the data flowing through the topology is always at a higher transfer rate than S100, the internodal propagation time, measured employing the ping packet transferred at a rate of S100, is greater than the propagation time taken for the actual data transfer. Therefore, the gap count calculated on the basis of the internodal propagation time is increased, resulting in a problem that the gap count can not be appropriately optimized.

SUMMARY OF THE INVENTION

In view of the foregoing, an object of this invention is to provide a data transfer system, a data transfer management apparatus and a data transfer method, in which the gap count can be optimized.

The foregoing objects and other objects of the invention have been attained by the provision of a data transfer system including a plurality of devices each having different rate for transferring data and a different delay time for sending back the data depending on the transfer rate, wherein predetermined data is transferred in accordance with a slowest transfer rate in the data transfer system to make more effective use of the band useful for the transfer.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 9 is a table for listing the location, name and operation of CRS;

FIG. 11 is an explanatory diagram showing an example of bus info block, root directory, and unit directory;

FIG. 12 is an explanatory diagram showing an example of the configuration of a PCR;

FIG. 16 is an explanatory diagram showing an example of the data format of a descriptor;

FIG. 17 is an explanatory diagram showing an example of the generation ID of FIG. 16;

FIG. 18 is an explanatory diagram showing an example of the list ID of FIG. 16;

FIGS. 23A and 23B are explanatory diagrams showing a specific example of the command and response of the AV/C command;

FIG. 25 is a schematic diagram for explaining the arbitration signal generating rules;

FIG. 26 is a schematic diagram for explaining the arbitration signal generating rules;

FIG. 27 is a schematic diagram for explaining the arbitration signal decoding rules;

FIG. 28 is a schematic diagram for explaining the line status of an arbitration signal sent at the physical layer;

FIG. 29 is a schematic diagram for explaining the line status of an arbitration signal received at the physical layer;

FIG. 31 is a schematic diagram for explaining the transmission symbols assigned to the arbitration;

FIG. 32 is a schematic diagram for explaining the arbitration assigned to the received symbol;

FIG. 33 is a schematic diagram for explaining the symbols assigned to the data;

DETAILED DESCRIPTION

Preferred embodiments of this invention will be described with reference to the accompanying drawings.

First will be described a digital serial interface device (LD1394: Long Distance IEEE1394) in which a digital serial data interface with the arbitration for the control right of the bus prior to data transfer as in the IEEE 1394 standards has an extension of internodal cable to effect long distance.

Figure 30:
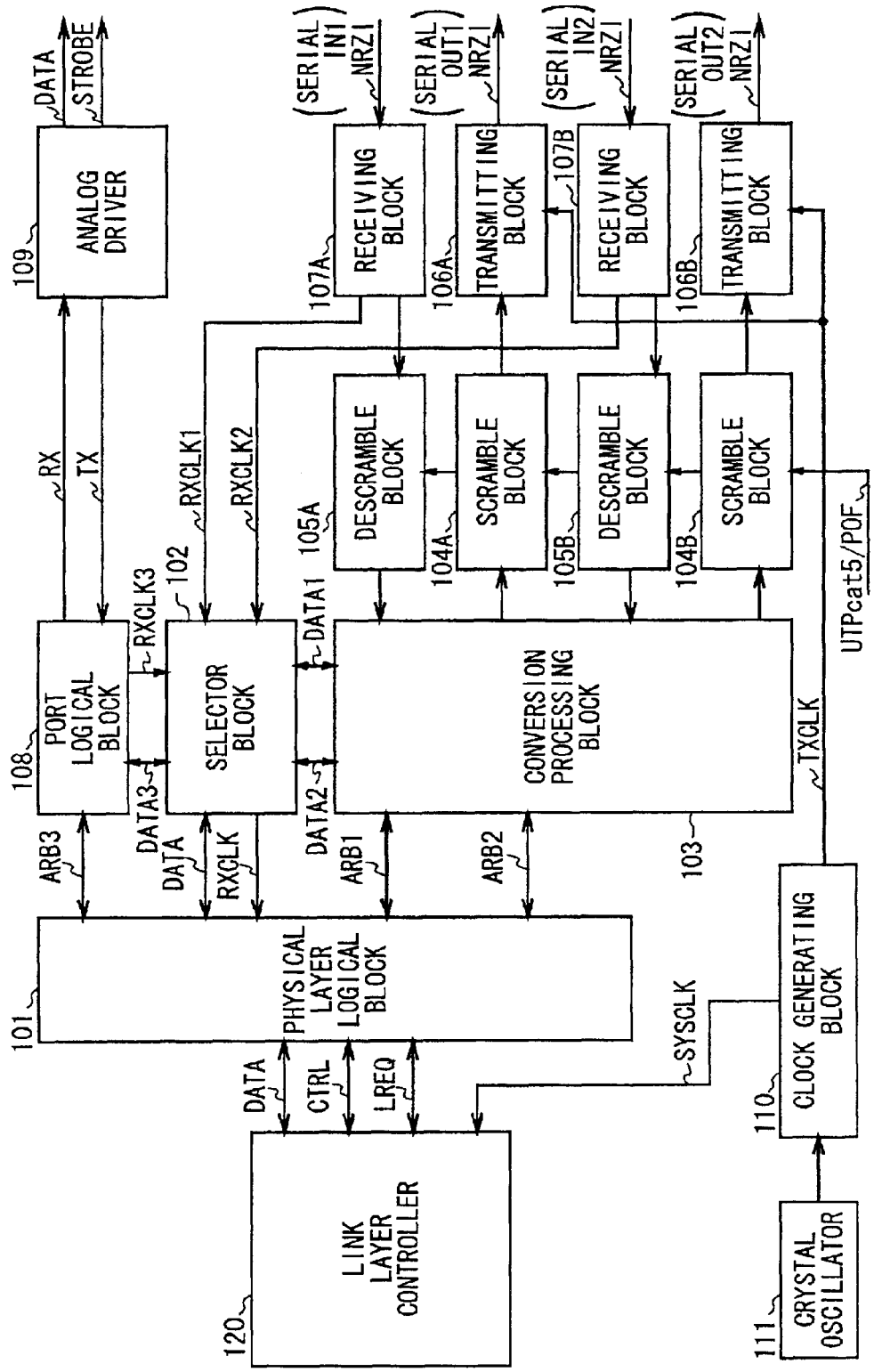
FIG. 30 is a block diagram showing the configuration of a physical layer according to this invention.

The physical layer (interface device) of the LD1394 comprises a physical layer logical block (PHY LOGIC) 101, a selector block (RXCLOCK/DATA SELECTOR) 102, a conversion processing block (4B/5B CONVERTER & ARB SIGNAL CONVERTER) 103, scramble blocks (SCRAMBLE1, SCRAMBLE2) 104A and 104B, descramble blocks (DE-SCRAMBLE1, DE-SCRAMBLE2) 105A and 105B, transmitting blocks (P/S1, P/S2) 106A and 106B, receiving blocks (RX-PLLS/P1, RX-PLLS/P2) 107A and 107B, a port logical block (PORT LOGIC) 108, an analog driver (ANALOG DRIVER) 109 and a clock generating block (PLL) 110, as shown in FIG. 30.

The physical layer logical block 101 makes the I/O control and the arbitration control with the link layer in the IEEE 1394 standards, and is connected to a link layer controller 120 conforming to the IEEE 1394 standards, as well as to the selector block 102, the conversion processing block 103 and the port logical block 108.

Herein, the I/O with the link layer in this physical layer logical block 101 is equivalent to that of the IEEE 1394 standards, in which the communication between the link layer and the physical layer is effected by a data signal DATA and a control signal CTRL, a link request signal LREQ being additionally input into the physical layer logical block 101 as a transmission request from the link layer to the physical layer.

This physical layer logical block 101 contains an arbitration controller, which controls an arbitration process and the transmission and reception via the bus. If there is a transmission request for the packet, the arbitration is started after an appropriate gap time. Also, this physical layer logical block 101 passes an arbitration request from the link layer to the conversion processing block 103 and the port logical block 108.

The selector block 102 selects one pair among the data DATA1, DATA2 received via the conversion processing block 103 and its reception clocks RXCLK1, RXCLK2, and the data DATA3 received via the port logical block 108 and its reception clock RXCLK3, and is connected to the physical layer logical block 101, the conversion processing block 103, the receiving blocks 107A, 107B and the port logical block 108.

In the case of data transmission, this selector block 102 sends the packet data DATA passed from the physical layer logical block 101 to the conversion processing block 103 and the port logical block 108. Thereby, the transmission data is passed to all the transmission ports.

Also, in the case of data reception, the selector block 102 selects one pair among the packet data DATA1, DATA2 and DATA3 received via the conversion processing block 103 or the port logical block 108 and their reception clocks RXCLK1, RXCLK2, RXCLK3, and sends the selected packet data and its reception clock, DATA1 AND RXCLK1, for example, to the physical layer logical block 101. And the packet data DATA1 selected by the selector block 102 is written into the FIFO memory within the physical layer logical block 101 at its reception clock RXCLK1, and read out at a system clock SYSCLK supplied from the clock generating block 110.

The conversion processing block 103 functions as 4-bit (4B)/5-bit (5B) data converting processing means and arbitration signal converting processing means for assigning a 5-bit symbol other than the 5-bit symbol assigned to the data in this 4B/5B converting process to an arbitration signal.

At the time of arbitration, the conversion processing block 103 converts the arbitration signals ARB1, ARB2 passed from the physical layer logical block 101 into one or two 5-bit symbols assigned as shown in FIGS. 31 and 32, which are then sent to the scramble blocks 104A, 104B. At the same time, the conversion processing block 103 converts the 5-bit arbitration signals passed from the descramble blocks 105A and 105B into 4-bit signals, which are then sent to the physical layer logical block 101.

That is, at the time of transmission, each arbitration, except for TX_DATA_PREFIX and BUS_RESET, is assigned one symbol, TX_DATA_PREFIX is assigned two symbols (11000 10001), and BUS_RESET is assigned two symbols (00000 11111), as shown in FIG. 31.

Also, at the time of transmitting the packet data, the conversion processing block 103 or the selector block 102 is converted into the 5-bit signals assigned as shown in FIG. 33, which are then sent to the scramble blocks 104A and 104B. Also, the conversion processing block 103 converts the 5-bit received packet data passed from the descramble blocks 105A, 105B into the 4-bit signal that is then sent to the selector block 102.

Herein, in the 4B/5B conversion process in the conversion processing block 103, the 5-bit symbols containing a clock component as shown in FIG. 33 are assigned to the packet data DATA1 and DATA2. Thereby, on the reception side of DATA1 and DATA2, the clock generating block 110 can surely generate the reception clocks RXCLK1 and RXCLK2 from the received signal.

An idle state in the arbitration of the IEEE 1394 standards is assigned to IDLE (11111) or a 5-bit symbol composed of 11111 containing the most amount of clock information, whereby the arbitration can be reliably executed even in the idle state in the arbitration by keeping a lock state of the clock generating block 110 on the reception side.

The scramble blocks 104A and 104B apply a scrambling process with the shift register to a 5-bit transmission signal passed from the conversion processing block 103 at the time of transmitting the packet data, thereby reducing unnecessary radiation of the 5-bit transmission signal. The 5-bit transmission signals scrambled by the scramble blocks 104A and 104B are sent to the transmitting blocks 106A and 106B, respectively.

Further, since the arbitration signals other than IDLE (11111), TX_DATA_PREFIX (11000 10001) and BUS_RESET (00000 11111) have leftmost two bits of "0", if two bits of "0" are found in making synchronization of symbols after the serial/parallel conversion, the two bits are assumed to be at the top of the symbol, and each arbitration signal can be determined with 5 bits containing the two bits as one symbol.

BUS_RESET (00000 11111) can be determined if consecutive 5 bits of "0" are received without considering two bits of "0". TX_DATA_PREFIX (11000 10001) can be detected independently of other arbitration signals. That is, the received data is shifted bit by bit to prepare five data series, which are then compared with the bit pattern (11000 10001) of TX_DATA_PREFIX, and if matched, the reception of TX_DATA_PREFIX is determined. Since the packet data is received in succession immediately after TX_DATA_PREFIX, the packet data can be synchronized by receiving TX_DATA_PREFIX.

Also, since TX_DATA_END (01101) is received in succession immediately after the packet data, TX_DATA_END can be detected by the same symbol synchronization as TX_DATA_PREFIX and the packet data. Since the bit pattern (11000 10001) of TX_DATA_PREFIX does not appear in the data series of the packet data converted as in FIG. 33, it is not detected in the packet data, even though the symbol synchronization can not be effected, so that erroneous reception of data does not occur. Further, no arbitration signals other than TX_DATA_END and BUS_RESET are detected after detecting TX_DATA_PREFIX.

The descramble blocks 105A and 105B apply a descramble process corresponding to the scramble process of the scramble blocks 104A and 104B to the 5-bit received signals passed from the receiving blocks 107A and 107B, so that the 5-bit received signals are sent. Herein, the scramble blocks 104A, 104B and the descramble blocks 105A, 105B can switch on or off each operation.

The transmitting blocks 106A and 106B convert the 5-bit transmitting signal scrambled by the scramble blocks 104A and 104B from parallel data into serial data, and further convert the non return zero (NRZ) data into the non return to zero and invert on ones (NRZI) data that is then sent.

The receiving blocks 107A and 107B convert the received signal from the NRZI data into the NRZ data, and further convert serial data into parallel data to send the 5-bit received signal to the descramble blocks 105A and 105B. Also, the receiving blocks 107A and 107B enable the clock generating block 110 to generate the reception clocks RXCLK1 and RXCLK2 from the received data, which are then passed to the selector block 102.

The port logical block 108 sends and receives the arbitration signal ARB3 and the DATA 3 conforming to the physical layer of the IEEE 1394 standards and generates a reception clock RXCLK3 from the data and its strobe signal passed via the analog driver 109. Also, this port logical block 108 has an arbitration signal ARB3 sent from the physical layer logical block 101 at the time of arbitration.

And, at the time of transmitting the data, the port logical block 108 converts the packet data DATA3 passed via the selector block 102 from the physical layer logical block 101 into serial data at a transmission clock TXCLK supplied from the clock generating block 110, and sends the obtained serial data through the analog driver 109.

At the time of receiving the data, the port logical block 108 sends the packet data DATA3 received via the analog driver 109 together with its reception clock RXCLK3 via the selector block 102 to the physical layer logical block 101. In the case where the port logical block 108 is selected by the selector block 102, the packet data DATA3 is written into the FIFO memory within the physical layer logical block 101 at its reception clock RXCLK3.

The clock generating block 110 generates a system clock SYSCLK of 49.152 MHz and a transmission clock of 98.304 MHz (S100), 196.608 Mbps (S200), or 393.216 Mbps (S400) from the clock of 24.576 MHz supplied from a crystal oscillator (X'TAL) 111.

The interface device thus configured is provided with the conversion processing block 103 for performing the 4B/5B conversion processing for the arbitration signals ARB1, ARB2 and the packet data DATA1, DATA2 to enable the arbitration signals ARB1, ARB2 and the packet data DATA1, DATA2 as the 5-bit code data to be transmitted or received via the transmitting blocks 106A, 106B and the receiving blocks 107A, 107B, thereby making it possible to perform long distance transfer employing optical fiber cable or inexpensive Unshielded Twisted Pair (utp) cable for the transmission.

This interface device is further provided with the port logical block 108 and the analog driver 109 conforming to the physical layer of the IEEE 1394 standards, thereby enabling the switching of the transmission path between the cable conforming to the IEEE 1394 standards and the optical fiber cable or UTP cable.

Figure 34:
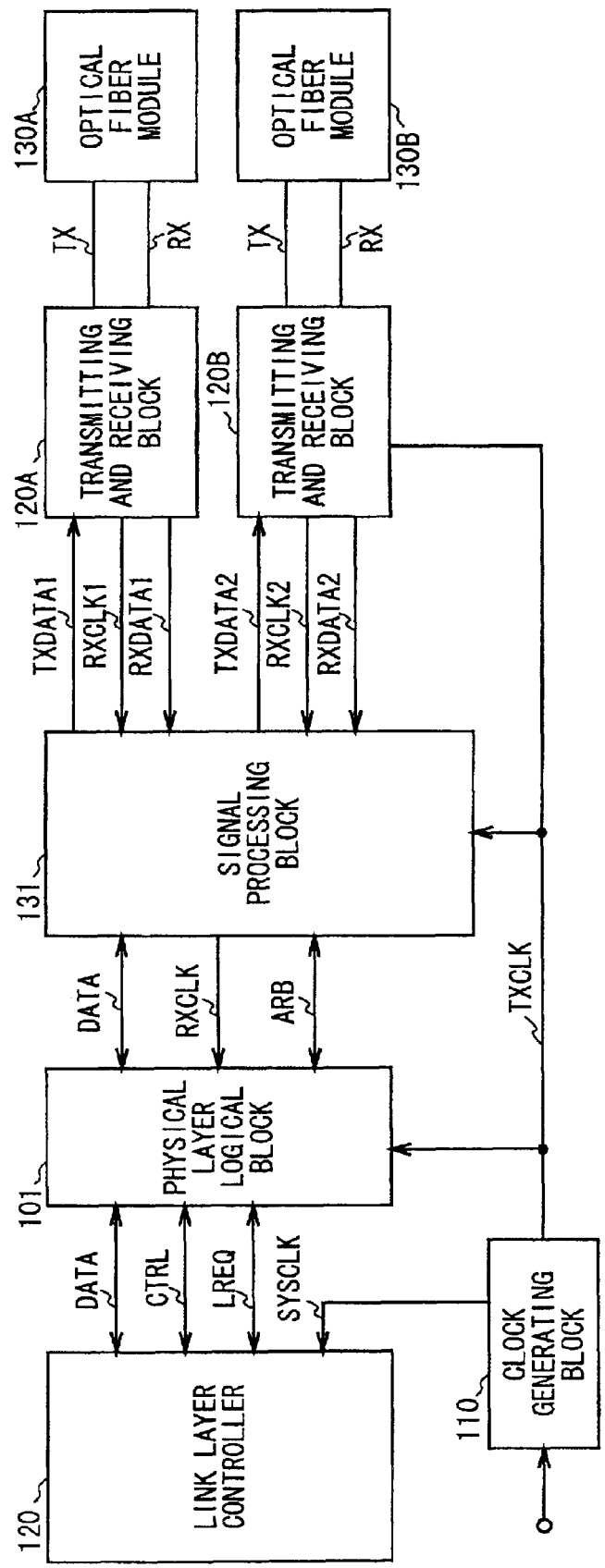
FIG. 34 is a block diagram showing the configuration of the physical layer.

That is, the interface device, as shown in FIG. 34, for example, has an optical fiber module 130A (OPF MODULE, OPF: Optical Fiber) connected to a transmitting and receiving block 120A composed of a transmitting block 106A and a receiving block 107A in the interface device as described above and shown in FIG. 30, thereby enabling an optical fiber cable to be coupled via this optical fiber module 130A.

At the time of transmitting the data, the optical fiber modules 130A and 130B convert an electrical signal of NRZI from the transmitting and receiving blocks 120A and 120B into an optical signal, which is then passed to the optical fiber cable. Also, at the time of receiving the data, the optical fiber modules 130A and 130B convert an optical signal passed via the optical fiber cable into an electrical signal of NRZI, which is then sent to the transmitting and receiving blocks 120A, 120B.

The interface device shown in FIG. 34 dispenses with the port logical block 108 and the analog driver 109 of the interface device shown in FIG. 30, and is dedicated for connection with the optical fiber cable. Also, one signal processing block 131 is substituted for the selector block 102 and the conversion processing block 103 of the interface device shown in FIG. 30.

Further, in the case where optical fiber cable is employed for the transmission path, the scramble blocks 104A, 104B and the descramble blocks 105A and 105B are deleted because of no unnecessary radiation. The optical fiber modules 130A and 130B are provided for long distance transmission, and called a physical media dependent (PDM). Namely, this PDM functions as an input/output interface module with the outside device.

Figure 1:
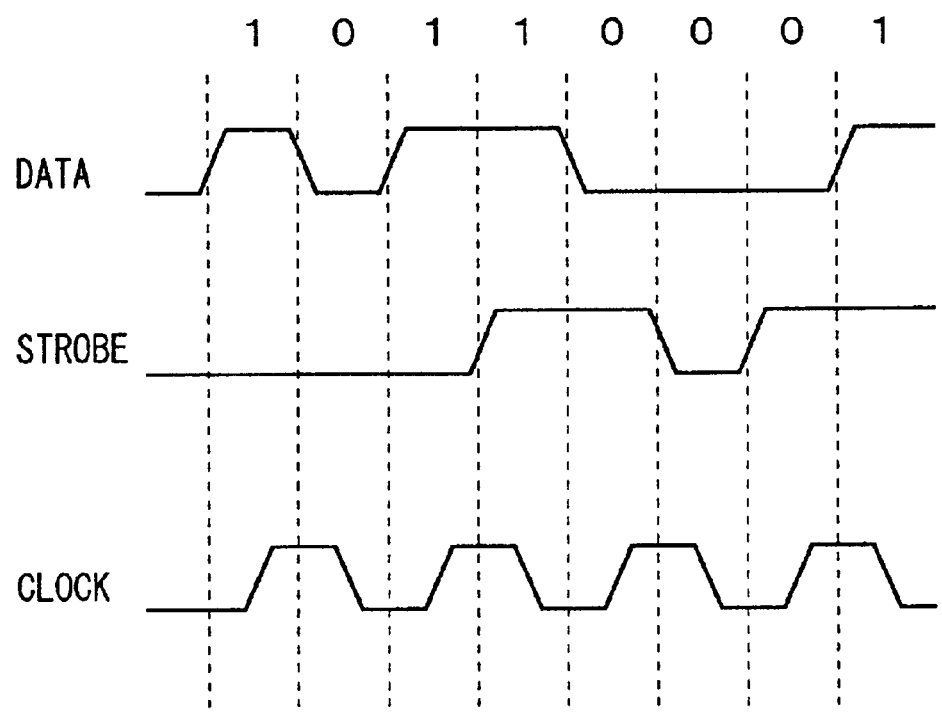
FIG. 1 is a schematic diagram for explaining a DS-Link encoding method.
Figure 2:
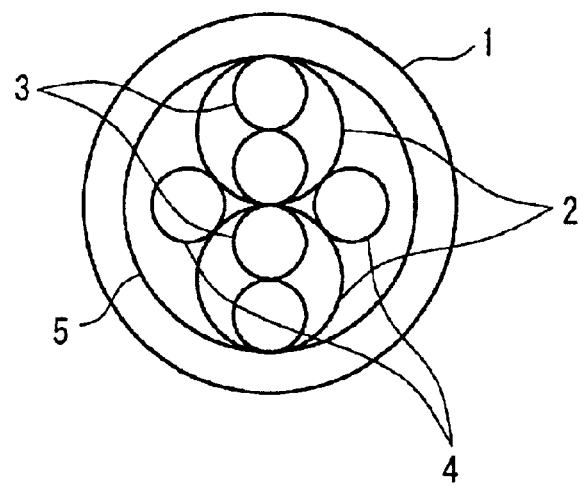
FIG. 2 is a typical view illustrating a cable structure.
Figure 4:
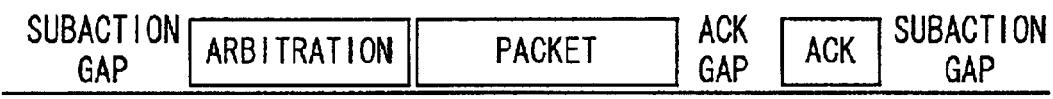
FIG. 4 is a schematic diagram for explaining an asynchronous transfer of packets.
Figure 3:
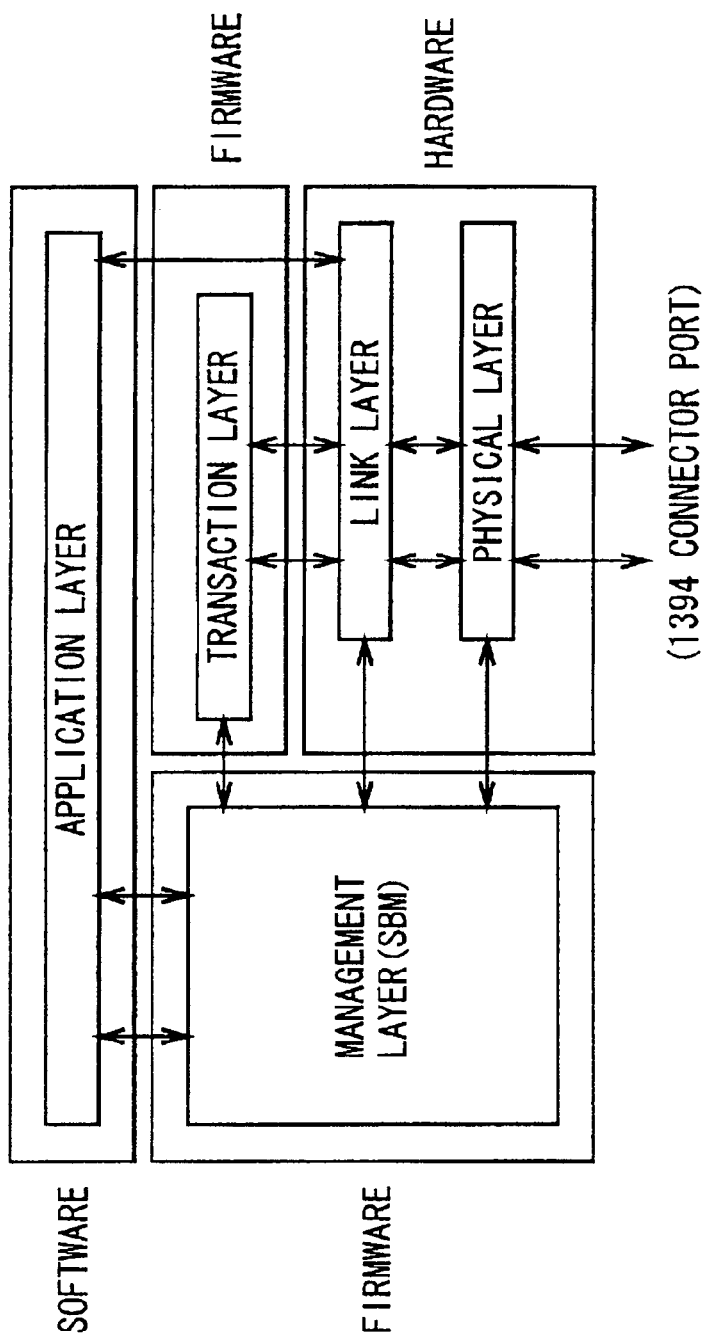
FIG. 3 is a schematic diagram for explaining components of an interface and a protocol architecture.
Figures 5A, 5B:
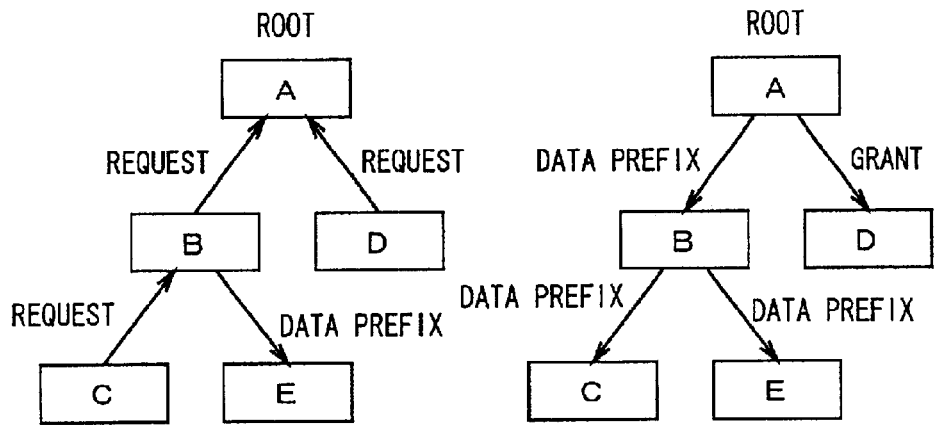
FIGS. 5A and 5B are schematic diagrams for explaining an arbitration.
Figure 6:
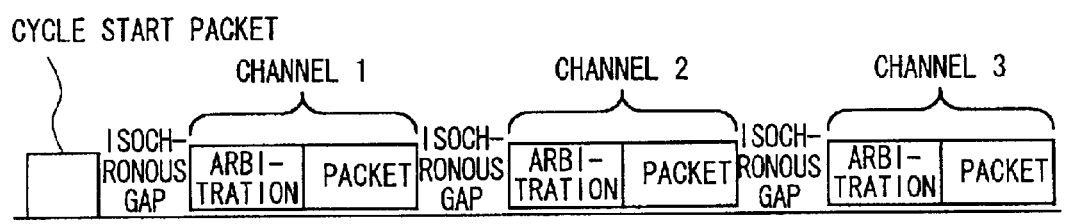
FIG. 6 is a schematic diagram for explaining the isochronous transfer of packets.
Figure 7:
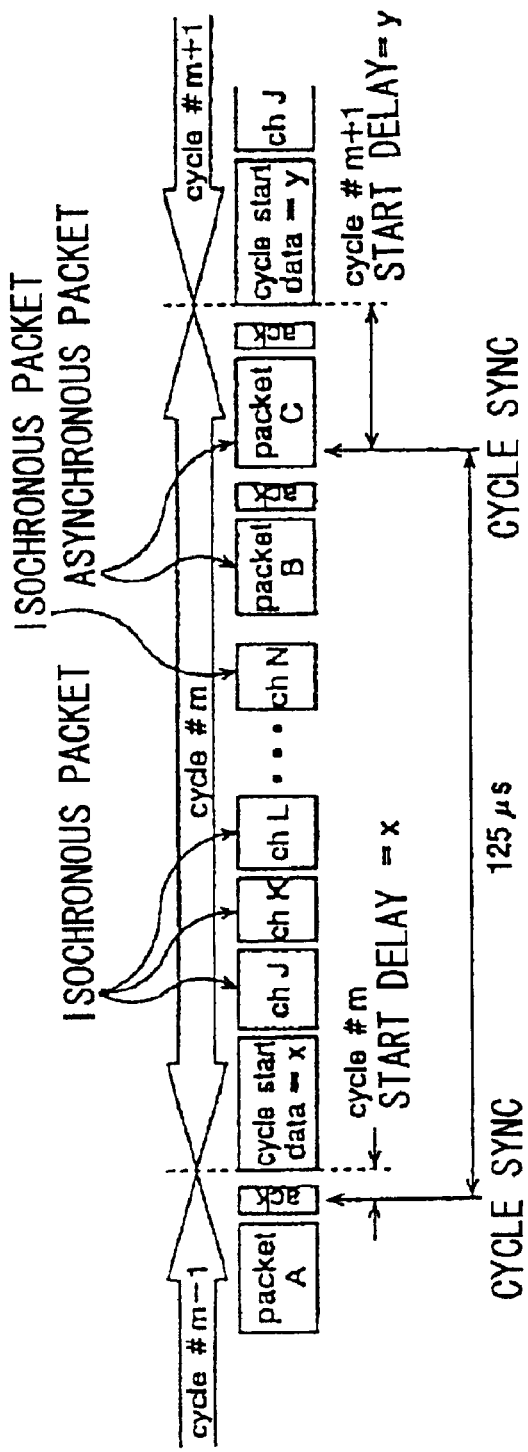
FIG. 7 is an explanatory diagram showing an example of a cycle structure of data transmission through a bus in accordance with the IEEE 1394 standards.
Figure 8:
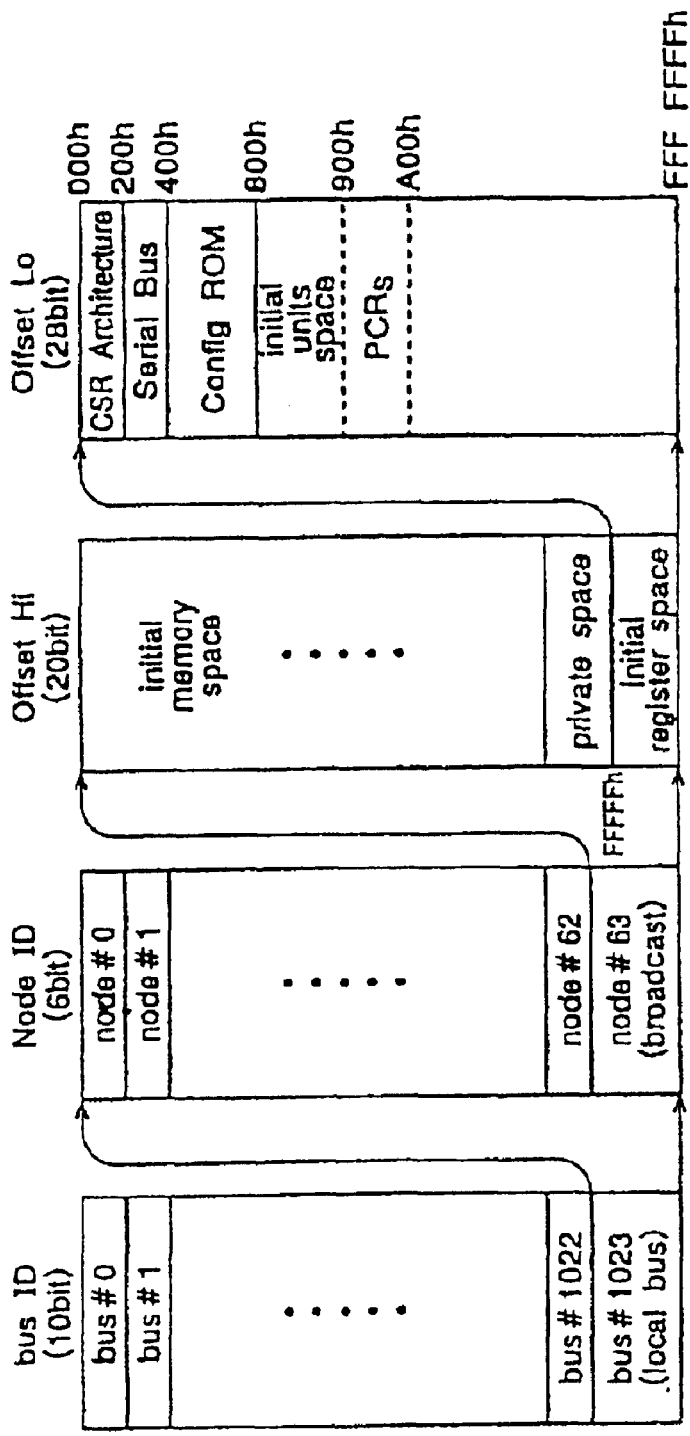
FIG. 8 is an explanatory diagram showing an example of the structure of an address space in a CRS architecture.
Figure 10:
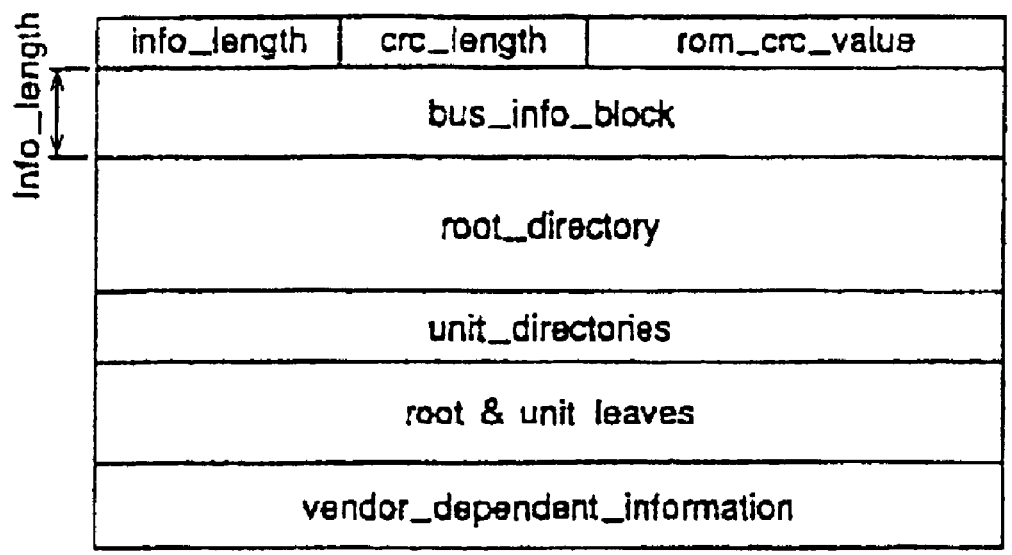
FIG. 10 is an explanatory diagram showing an example of a general ROM format.
Figures 13A, 13B, 13C, 13D:
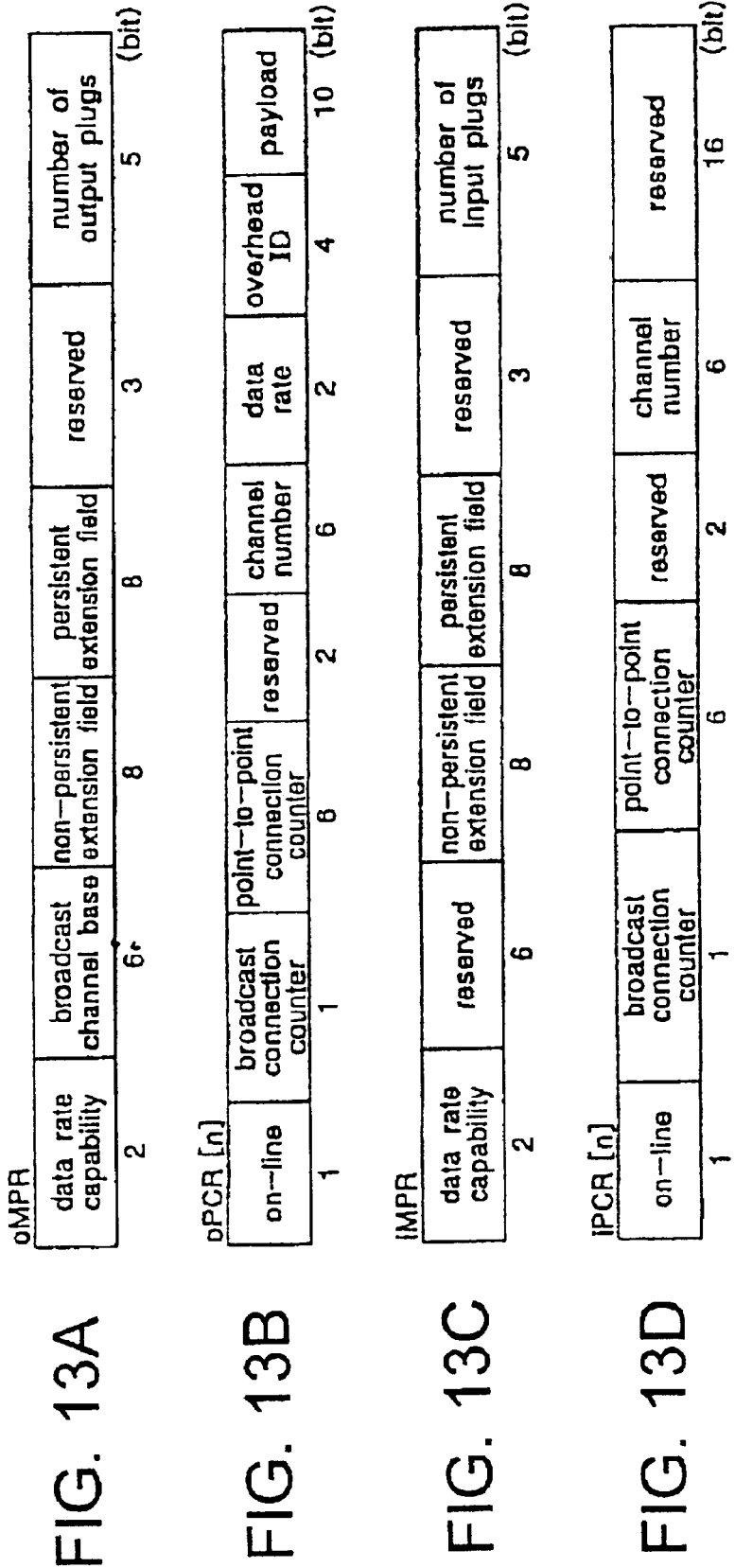
FIGS. 13A to 13D are explanatory diagrams showing an example of an oMPR, an oPCR, an iMPR and an iPCR.
Figure 14:
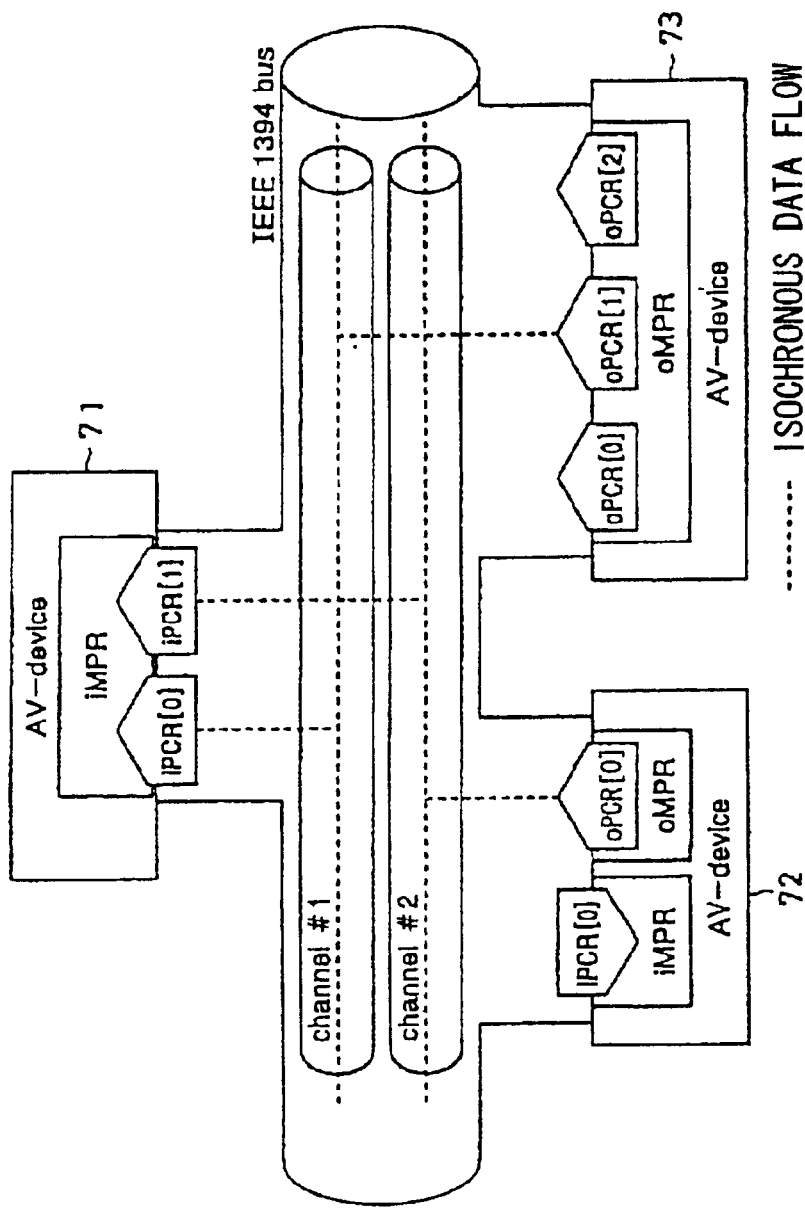
FIG. 14 is a schematic diagram showing an example of the relation of the plug, plug control register and transmission channel.
Figure 15:
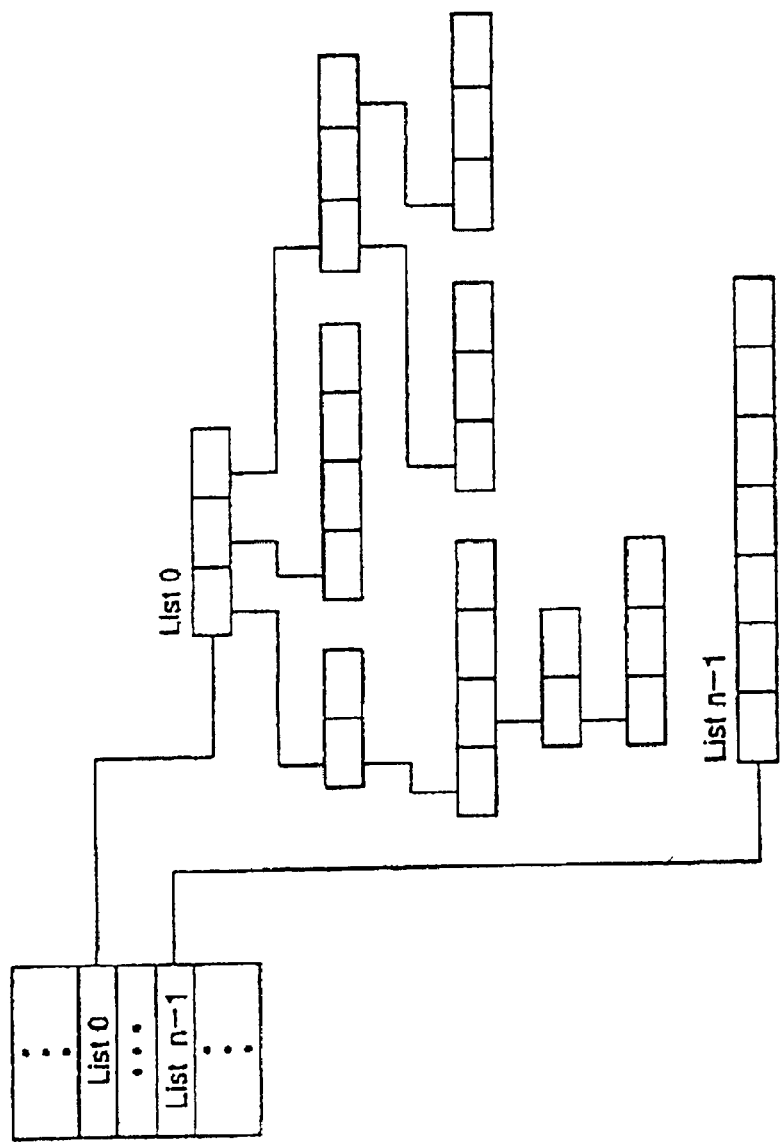
FIG. 15 is an explanatory diagram showing an example of the data structure with a hierarchical structure of a descriptor.
Figure 19:
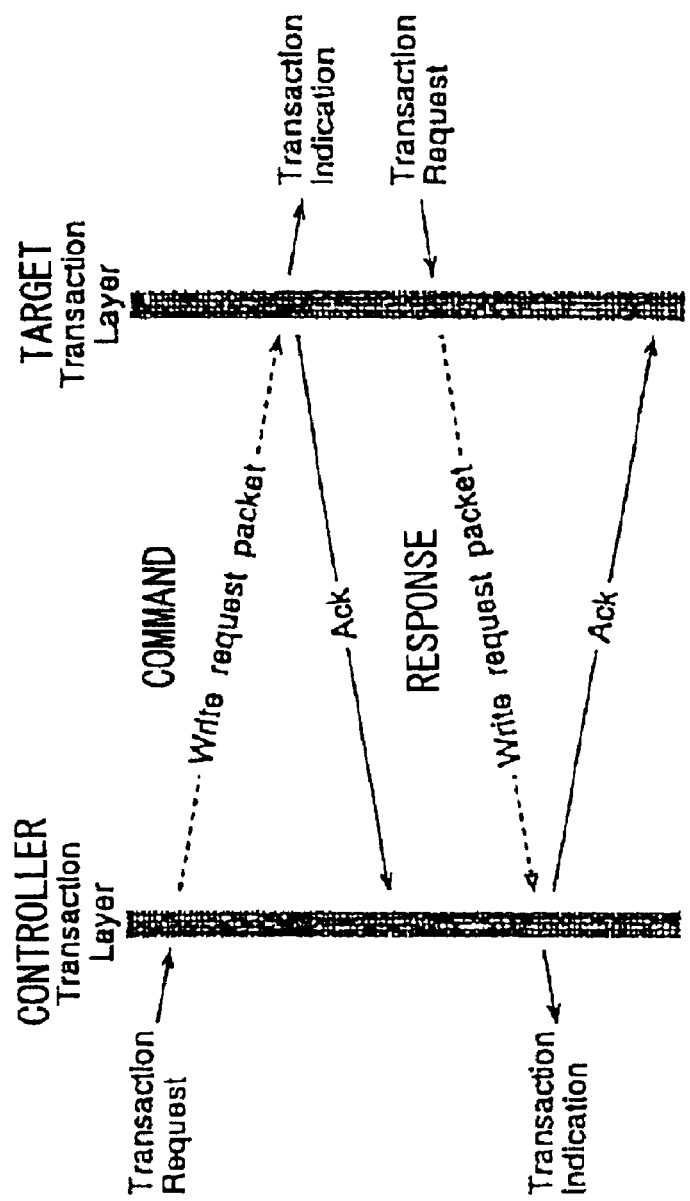
FIG. 19 is an explanatory diagram showing the relation between the command and the response of an FCP.
Figure 20:
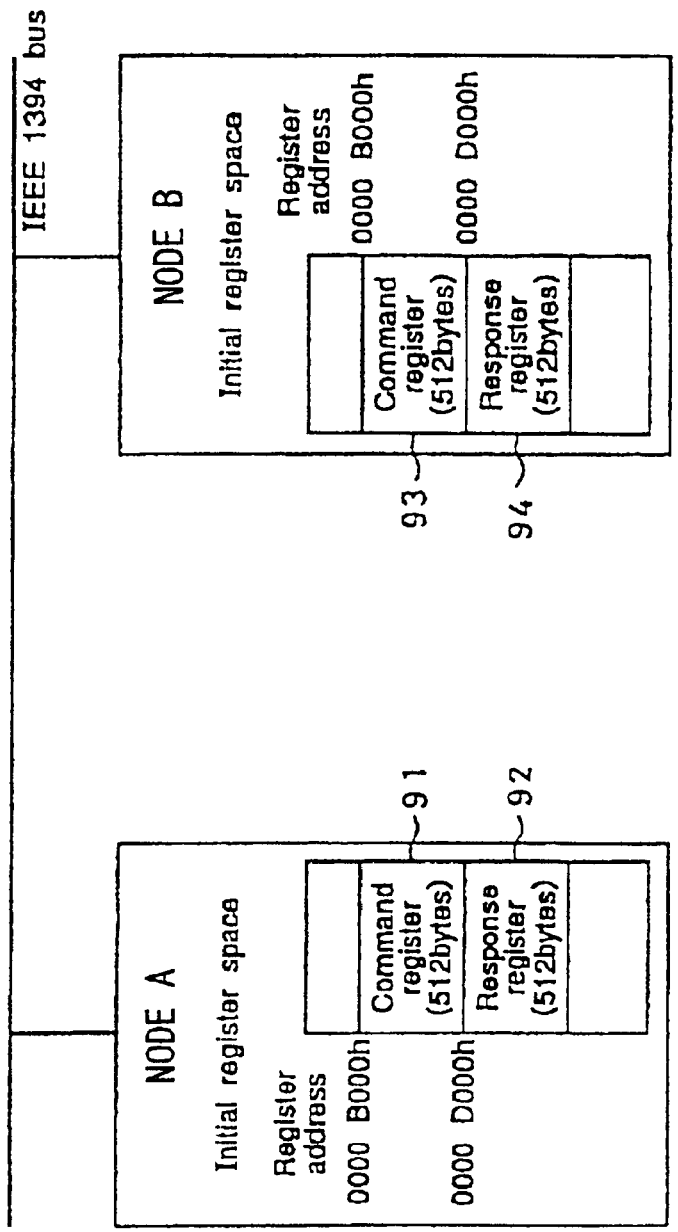
FIG. 20 is an explanatory diagram showing in more detail the relation between the command and the response of an FCP in the AV/C command set.
Figure 21:
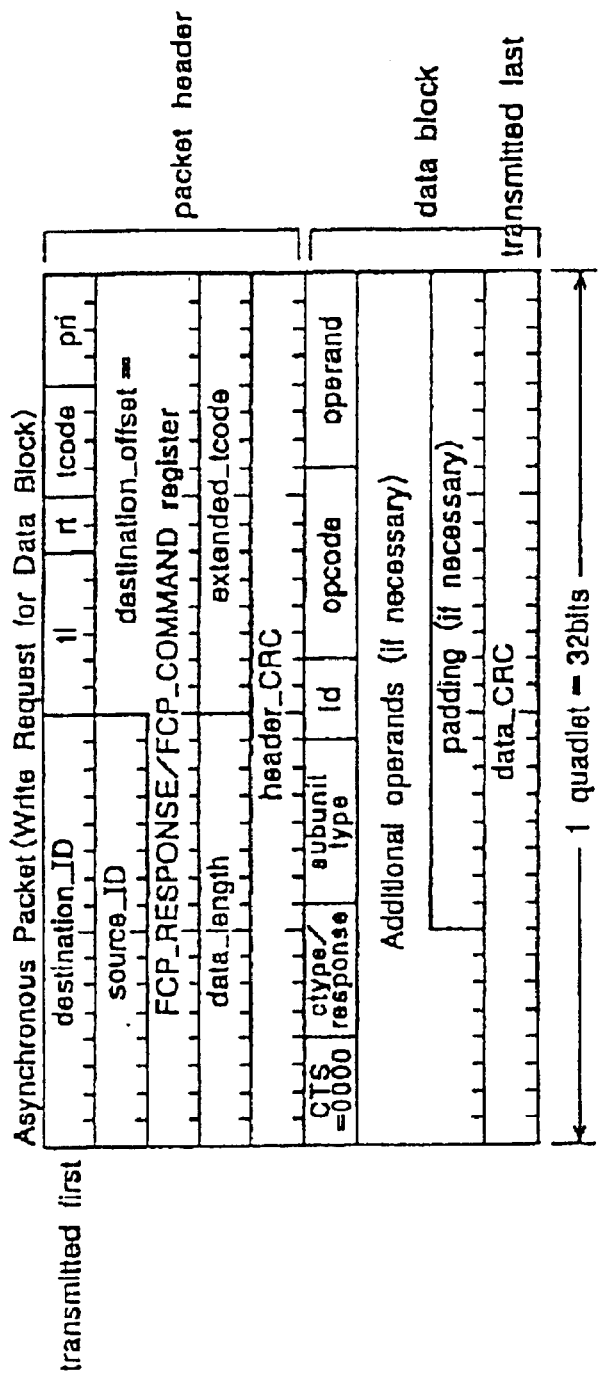
FIG. 21 is an explanatory diagram showing an example of a data structure in the AV/C command.
Figures 22A, 22B, 22C:
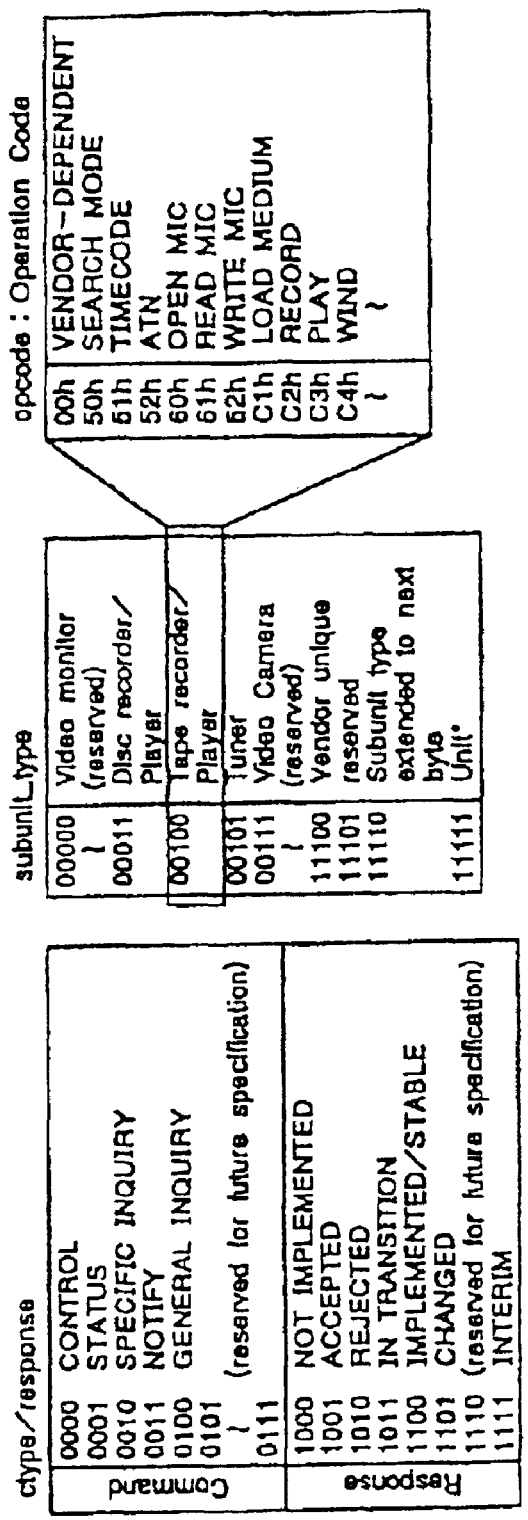
FIGS. 22A to 22C are explanatory diagrams showing a specific example of the AV/C command.
Figure 24:
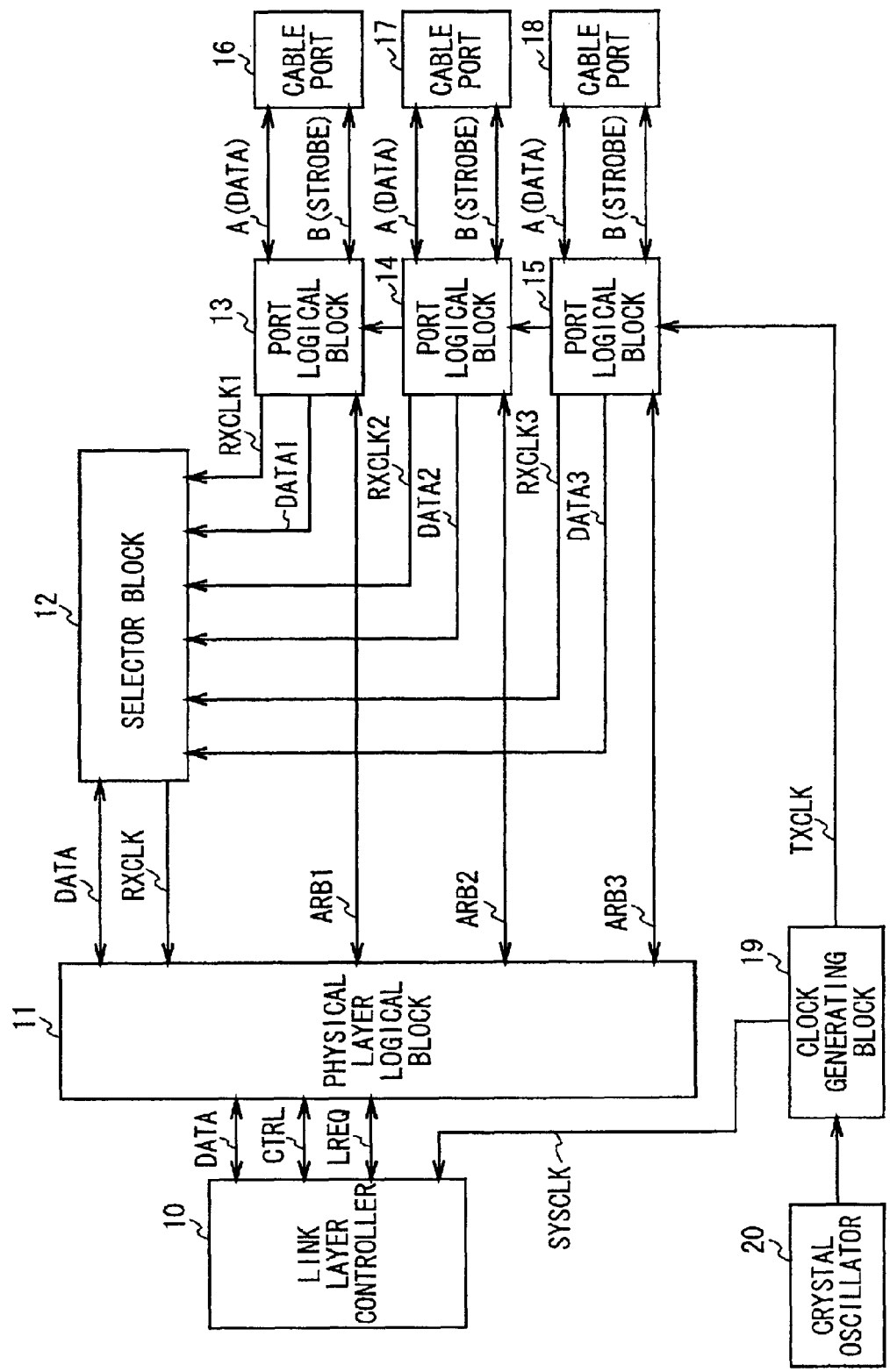
FIG. 24 is a block diagram showing the configuration of a physical layer.
Figure 35:
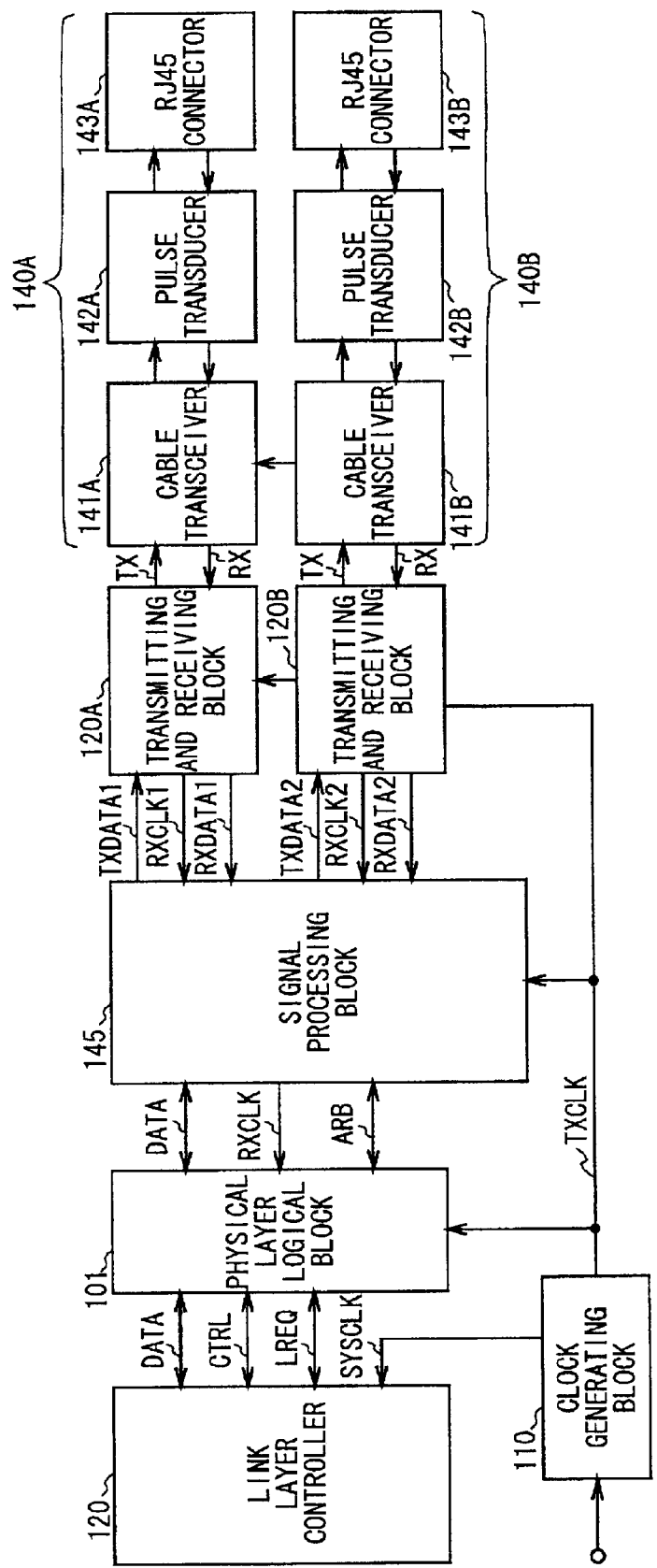
FIG. 35 is a block diagram showing the configuration of the physical layer.

Like the interface device shown in FIG. 35, for example, the optical fiber modules 130A and 130B that are PDM in the interface device described above and shown in FIGS. 5A and 5B are replaced with the UTP connection modules 140A and 140B, thereby enabling the UTP cable to be coupled.

That is, the transmitting and receiving block 120A is connected to a cable transceiver (CABLE TRANSCEIVER1) 141A, with which an RJ45 connector (RJ45 CONNECTOR1) 143A is connected via a pulse transducer (PULSE TRANS) 142A, thereby enabling the UTP cable to be coupled via the RJ45 connector 143A.

Similarly, the transmitting and receiving block 120B is connected to the cable transceiver (CABLE TRANSCEIVER2) 141B, with which an RJ45 connector (RJ45 CONNECTOR2) 143B for connection of UTP cable is connected via a pulse transducer (PULSE TRANS2) 142B, thereby enabling the UTP cable to be coupled via the RJ45 connector 143B.

At the time of data transmission, the cable transceivers 141A and 141B convert an NRZI signal from the transmitting and receiving blocks 120A, 120B into an MLT-3 (Multilevel Transmission3) signal, which is then sent to the pulse transducers 142A, 142B. Also, at the time of data reception, the cable transceivers 141A and 141B convert the MLT-3 signal passed via the pulse transducers 142A, 142B into the NRZI signal, which is then sent to the transmitting and receiving blocks 120A, 120B. The pulse transducers 142A, 142B interrupt the DC current between the cable transceiver and the cable.

The interface device as shown in FIG. 35 is dedicated for connection of the UTP cable. Also, one signal processing block 145 is substituted for the selector block 102, the conversion processing block 103, the scramble blocks 104A, 104B, and the descramble blocks 105A, 105B of the interface device shown in FIG. 30.

As described above, with the interface device shown in FIG. 30, the optical fiber cable or UTP cable is connected by exchanging the connection module to make the long distance transfer of digital serial data. And since the scramble blocks 104A, 104B and the descramble blocks 105A, 105B can switch on or off each operation, the scramble blocks 104A, 104B and the descramble blocks 105A, 105B are turned on to prevent unnecessary radiation when the UTP cable is connected.

Figure 36:
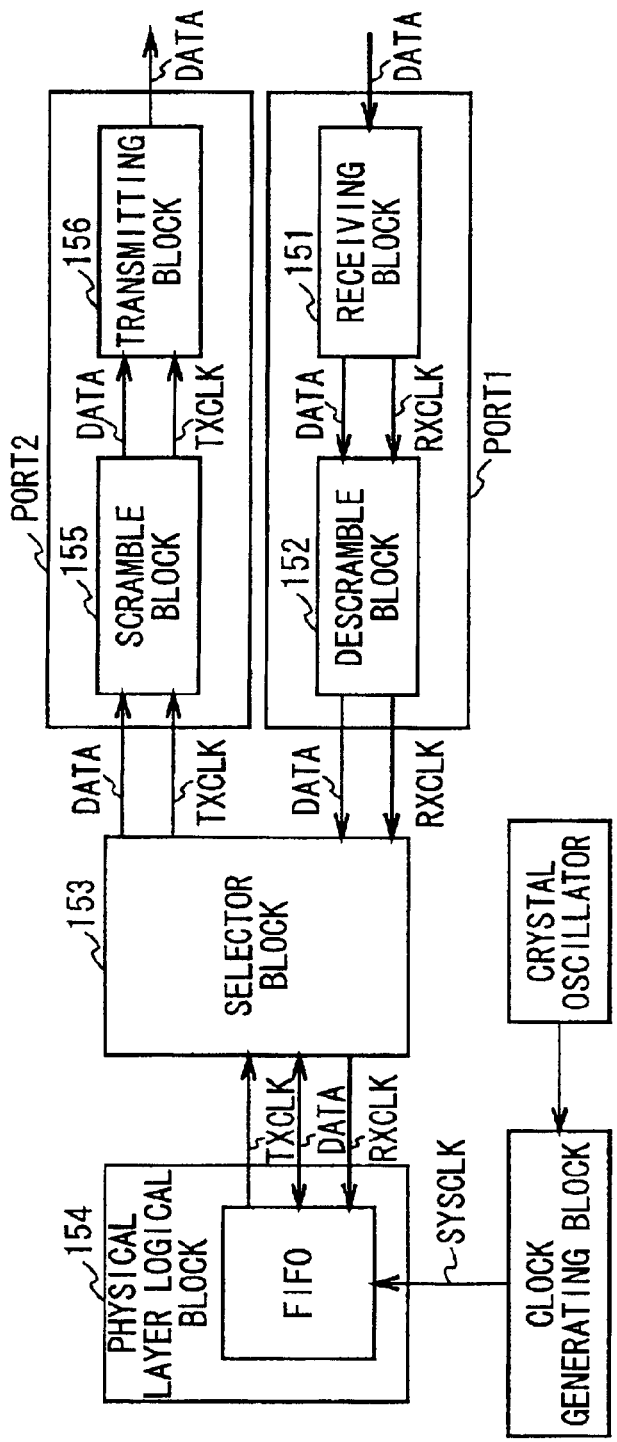
FIG. 36 is a schematic diagram for explaining the execution of data repeat.

Referring now to FIG. 36, the delay time when repeating the data in the IEEE 1394 interface device capable of long distance transfer as described above will be described below. For example, it is supposed that the data received at a long distance transmission port PORT1 is transmitted through a long distance transmission port PORT2. In FIG. 36, the transmitting block (P/S) of the long distance transmission port PORT1, the scramble blocks, the receiving block (RX-PLL, S/P) of the PORT2, and the descramble blocks, which are not employed for explanation here, are omitted.

Figure 37:
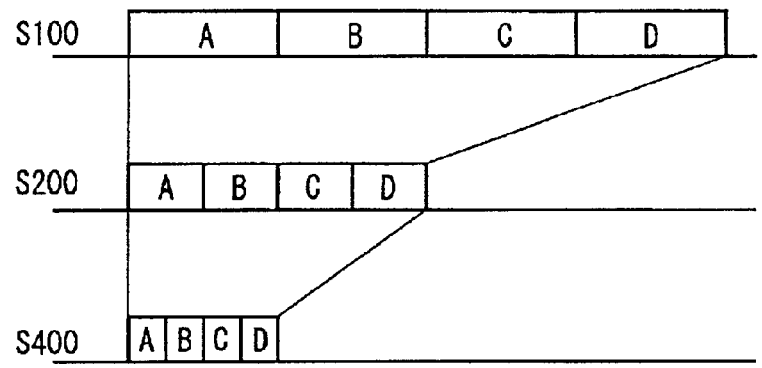
FIG. 37 is a schematic diagram for explaining the differences in the processing speed depending on the data transfer rate.

First of all, the data received at the long distance transmission port PORT1 is converted from serial to parallel form by the receiving block 151, and input into the descramble block 152 in units of symbol of 5 bits. The clock for use in this serial/parallel conversion is the reception clock RXCLK generated from the received data, and is different depending on the transfer rate of data. Namely, if the transfer rate of data is higher, it takes a shorter time to convert the received data from serial to parallel form and input it into the descramble block 152. As shown in FIG. 37, in S400 mode, the processing speed of data is typically about four times that in S100 mode.

In the descramble block 152, the data is descrambled in accordance with the reception clock RXCLK, and the descrambled data is passed to the selector block 153. In the case where the long distance transmission port PORT1 is an optical fiber module, this processing is omitted because the data is not scrambled.

In the selector block 153, the received 5-bit signal is converted into a 4-bit signal, and the data and block are selected. In this example, the data received from the long distance transmission port PORT1 and the reception clock RXCLK are passed to the physical layer logical block 154.

The physical layer logical block 154 contains the FIFO for storing the transmission or reception data, and the data input from the selector block 153 is written into the FIFO in units of 8 bits, employing the clock of 49.152 MHz generated on the basis of the reception clock RXCLK. In the case where the received data from the selector block is less than 8 bits, dummy data is input into the remaining bits. Thereafter, the data is taken out in units of 8 bits on the basis of the system clock SYSCLK in the same manner as at the time of input, and after the dummy data, if any, is discarded, the data is passed to the selector block 153 together with the system clock SYSCLK.

The transmission data passed to the selector block 153 is transmitted from the long distance transmission port PORT2 in accordance with a procedure inverse to that at the receiving time. That is, after the 5B/4B conversion in the selector block 153, the transmitting data is scrambled in the scramble block 155 only when the UTP cable is connected, converted from parallel to serial form in the transmitting block 156, and forwarded to the bus. Herein, it also takes a different time to transmit the data, depending on the transfer rate of data in the same manner as at the time of reception.

Namely, in the physical layer that is configured as shown in FIG. 30, if the transfer rate of data is higher, it takes a shorter time to repeat the data (hereinafter referred to as the PHY delay). This feature does not depend only on the 4B/5B coding method or the scramble method of the LD 1394, but generally applies to the physical layers with the data converting operation employing the transmission or reception clock which is different with the transfer rate of data, as seen in the 8B/10B conversion in p1394.b.

Figure 38:
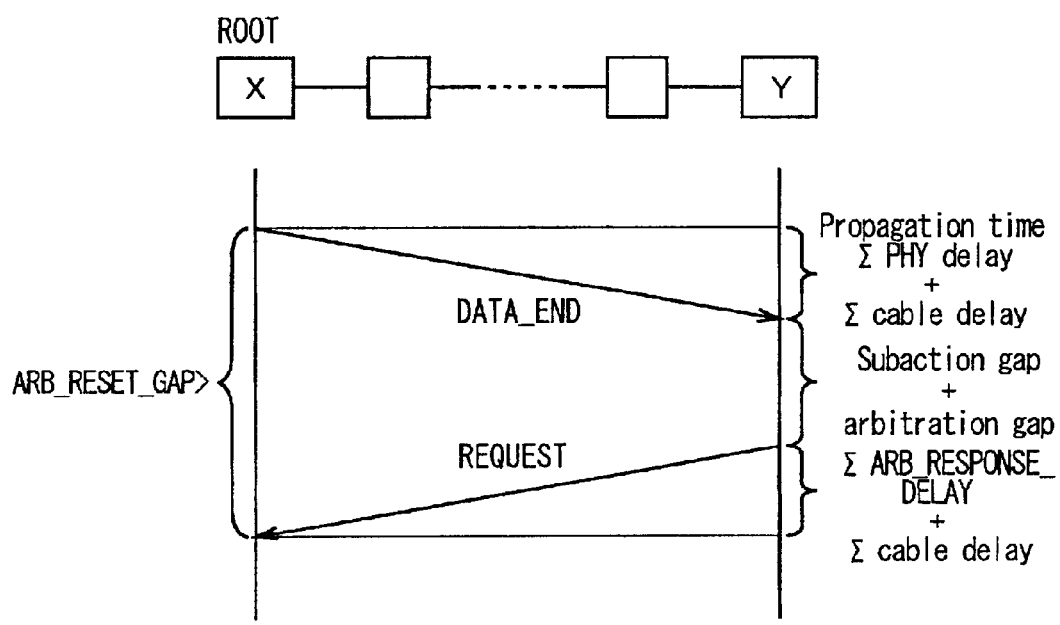
FIG. 38 is a schematic diagram for explaining the conditions satisfying the fair arbitration.

In the IEEE 1394 standards, all the nodes are assured to transmit asynchronous data uniformly, which is called a fair arbitration. For example, assuming that the nodes X and Y make a transmission request for asynchronous data, with the configuration of FIG. 38, a node X that is the root node first transfers the asynchronous data. A node Y having received the data transmitted from the node X receives the data end (DATA_END) transmitted from the node X, and then waits for a subaction gap (Subaction gap) to issue a request. At this time, if node X issues an asynchronous transfer request before accepting the request from the node Y, the node X gets the control over the bus again, so that the transfer request of the node Y is always rejected in some instances.

In this case, uniform asynchronous transfer can not be assured. Thus, in the IEEE 1394 standards, an arbitration reset gap (ARB_RESET_GAP) is defined, in which once all the nodes make the asynchronous transfer, an asynchronous transfer request can not be issued before the arbitration reset gap is detected. In this way, the fair arbitration is implemented. Namely, in the example of FIG. 38, if the arbitration reset gap is greater than the interval from the time when the node X sends the data end to the time when the node X accepts the request from the node Y, the fair arbitration can be assured. This condition can be represented in accordance with the following expression.

[Mathematical Expression 1]

$$\left[ \begin{array}{l} \text{Round\_Trip\_Delay}_{\max}^{[P_X \supset P_Y]} + \text{RESPONSE\_TIME}_{Y,\max}^{P_Y'} + \\ \text{subaction\_gap}_{\max}^{jY} + \text{arb\_delay}_{\max}^{jY} - \text{MIN\_IDLE\_TIME}_Y \end{array} \right] < \text{arb\_reset\_gap}_{\min}^{P_X} \qquad (1)$$

The idle time with the asynchronous transfer that can be determined by the gap count includes the subaction gap and the arbitration reset gap as defined. The maximum value of the gap count is 63. The subaction gap or the arbitration reset gap is reduced with the smaller gap count, giving rise to the merit that the idle time for the transfer band is shortened.

Solving the expression (1) for the gap count, the following expression results.

gap_count >

[Mathematical Expression 2]

$$BASERATE_{X,\max} \cdot \begin{bmatrix} \text{Round\_Trip\_Delay}_{\max}^{[P_X \supset P_Y]} + \\ \text{RESPONSE\_TIME}_{Y,\max}^{P_Y'} - \\ \text{MIN\_IDLE\_TIME}_Y + \\ \text{PHY\_DELAY}_{X,\max}^{P_X} \end{bmatrix} + \frac{29 \cdot \dfrac{BASERATE_{X,\max}}{BASERATE_{Y,\min}} - 51}{32 - 20 \dfrac{BASERATE_{X,\max}}{BASERATE_{Y,\min}}}$$

The idle time between data transfers can be suppressed by setting the minimum gap count satisfying this expression.

The extended use of the IEEE 1394 standards is p1394a. In p1394a, the four-pin connector and the extended PHY packet are newly defined, and the more efficient arbitration and power saving functions are incorporated. One of the extended PHY packets as defined in the p1394a is a Ping packet.

Figure 39:
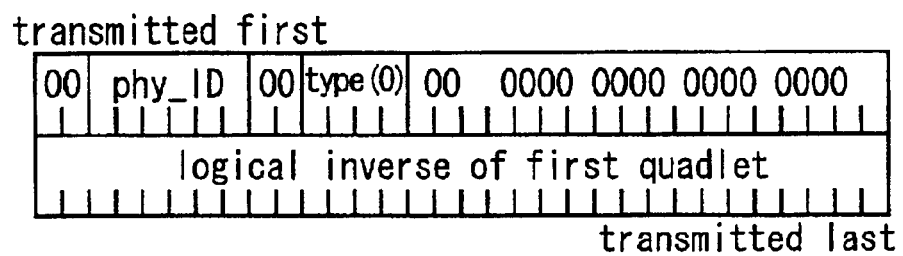
FIG. 39 is a schematic diagram for explaining the Ping packet.

The configuration of the Ping packet is shown in FIG. 39. The Ping packet is one of the cable PHY packets, and is sent to the node having the PHY ID as described in the PHY ID field. The physical layer of a p1394a associated node that has received this Ping packet sends back a Self-ID packet of its own to the node of the transmission source.

The transmission side obtains the propagation time between it and an arbitrary p1394a associated node by measuring the time interval from transmitting the Ping packet to receiving the Self-ID packet from the other side. A bus manager sends the Ping packet to all the leaf nodes within the topology, obtains a round trip delay max with respect to a node located farthest away, employing a propagation time for each node, and calculates the gap count using the above expression (2), thereby optimizing the gap count in the topology.

Thereby, it is sufficiently considered that the gap count is optimized using the Ping packet in the LD1394 as a matter of course. In general, the LD1394 has a greater amount of time to make negotiation than the IEEE 1394 standards, owing to an increased cable delay with the longer distance or a greater PHY delay with the 4B/5B conversion. Therefore, there is a problem with the limited band practically usable for the data transfer. Hence, an attempt to make effective use of the band by optimizing the gap count in the topology containing the LD1394 is considered to be important.

However, in the IEEE 1394 standards, the PHY packet must be sent at a transfer rate of S100, and in the p1394a, the Ping packet defined as one of the PHY packets must also be sent at a transfer rate of S100. Accordingly, the internodal propagation time obtained employing the Ping packet is equivalent to that when the data is sent at a transfer rate of In the IEEE 1394 standards, since the topology of devices can be constructed relatively freely, it is sufficiently considered that the physical layer with a different PHY delay in repeating the data depending on the transfer rate of data may be incorporated into the path, as seen in the physical layer of the LD1394.

In this topology, considering that the data flowing through the topology is always at a higher transfer rate than S100, the propagation time between nodes, measured employing the Ping packet transferred at a rate of S100, becomes greater than the propagation time taken in the actual data transfer. Therefore, the gap count calculated on the basis of this is increased, resulting in the problem with less appropriate optimization of the gap count.

Herein, the topology containing a node with a different PHY delay in repeating the data depending on the transfer rate of data, as represented by the physical layer of the LD1394 as described above, will be considered.

Figure 40:
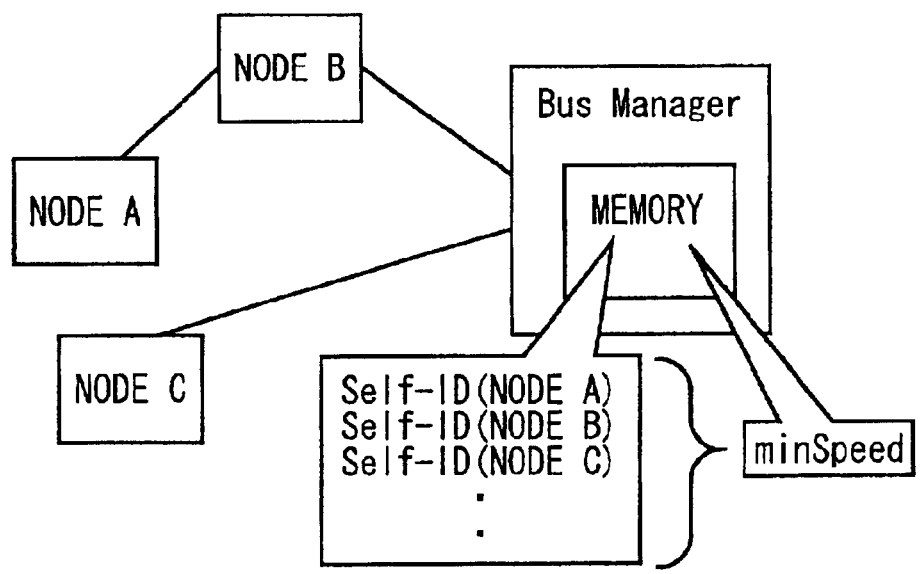
FIG. 40 is a schematic diagram for explaining the decision of minimum speed.

A bus manager (management device) at a Self identify phase in the IEEE 1394 standards operates as transfer rate deciding means to accept the Self-IDs of all the devices connected as shown in FIG. 40. The bus manager checks the value of the sp field indicating the transfer rate of each node within the Self-ID packet, obtains the slowest transfer rate of all the connected devices and stores it as the minimum speed (min Speed).

Herein, in the case where the minimum speed is S200, the bus manager operates as propagation time measuring means and reciprocation time calculating means to transmit the Ping packet at a rate of S200 to all the leaf nodes within the topology, and obtains the propagation time between the bus manager and each leaf node. The round trip delay for each leaf node is calculated on the basis of these values to obtain the maximum round trip delay (round trip delay max) or the maximum reciprocation time.

The bus manager operates as reference value calculating means to compute the gap count (reference value) employing the expression (2) on the basis of the round trip delay max obtained, sets this value in a gap_cnt field of a PHY configuration packet, and transmits the PHY configuration packet, thereby optimizing the gap count.

When the node effecting the isochronous transfer makes a reservation of the band used for the isochronous resource manager, the reservation of the band is conducted on the basis of the round trip delay max obtained here.

In the case where the minimum speed is S400, the bus manager transmits the Ping packet to all the leaf nodes within the topology at a rate of S400 and obtains the propagation time between the bus manager and each leaf node. The bus manager calculates the round trip delay between each leaf node on the basis of these values, and obtains the round trip delay max.

The bus manager calculates the gap count employing the expression (2) on the basis of the round trip delay max obtained, sets this value of gap count in the gap_cnt field of a PHY configuration packet, and transmits the PHY configuration packet to optimize the gap count.

When the node effecting the isochronous transfer makes a reservation of the band used for the isochronous resource manager, the reservation of the band is conducted on the basis of the round trip delay max obtained here.

With the above constitution, the minimum speed obtained in accordance with the above procedure is the lowest transfer rate of data within the topology to assure that the data is not transferred at a lower transfer rate than the minimum speed in the topology. Namely, in the case where a node with the minimum speed of S200 or S400, and having a physical layer with a different PHY delay depending on the transfer rate of data is contained within the topology, the Ping packet with the rate of S100 as defined in the p1394a does not allow the round trip delay actually taken in transferring the data to be obtained correctly. However, the round trip delay can be obtained correctly by transferring the Ping packet at the minimum speed employing the above method.

The gap count is optimized employing this round trip delay, so that the subaction gap and the arbitration reset gap as defined on the basis of the gap count can be suppressed low, and the idle time of the bus in the band for use with the asynchronous communication can be minimized. As a result, more bands can be used for the data transfer, leading to an increased actual transfer rate.

When a certain node makes the isochronous transfer, the node makes an application of the available band to an isochronous resource manager, but must take into consideration the time taken for the data propagation or negotiation to make the application of the band. However, if the node makes an application of the band on the basis of the round trip delay measured employing the Ping packet of S100, it is supposed that the band may be reserved beyond the band required for the transfer in the topology where the data is practically transmitted only at a rate of S200 or S400.

Herein, the time taken for the data propagation can be applied more accurately by obtaining the round trip delay employing the above method, so that the required band can be reduced even in flowing the same data. Hence, in synchronous communication, more bands can be employed for the data transfer, whereby the actual transfer rate can be expected to be increased.

With the above constitution, in the topology containing the node having the IEEE 1394 physical layer with a different PHY delay depending on the operation speed, if the round trip delay is obtained by transmitting the Ping packet at the slowest transfer rate in the topology, it is possible to set the optimal gap count rather than the gap count set employing the normal Ping packet in the topology in which all the nodes can transmit and receive the data at higher transfer rate than S100.

In this way, since the gap count is optimized, the subaction gap and the arbitration reset gap are shortened. Hence, the idle time of the data transfer can be reduced in the asynchronous communication.

By obtaining the round trip delay correctly, it is possible to make a more optimal application of resources to the isochronous resource manager, whereby the idle time of the bus can be reduced in synchronous communication.

Figure 41:
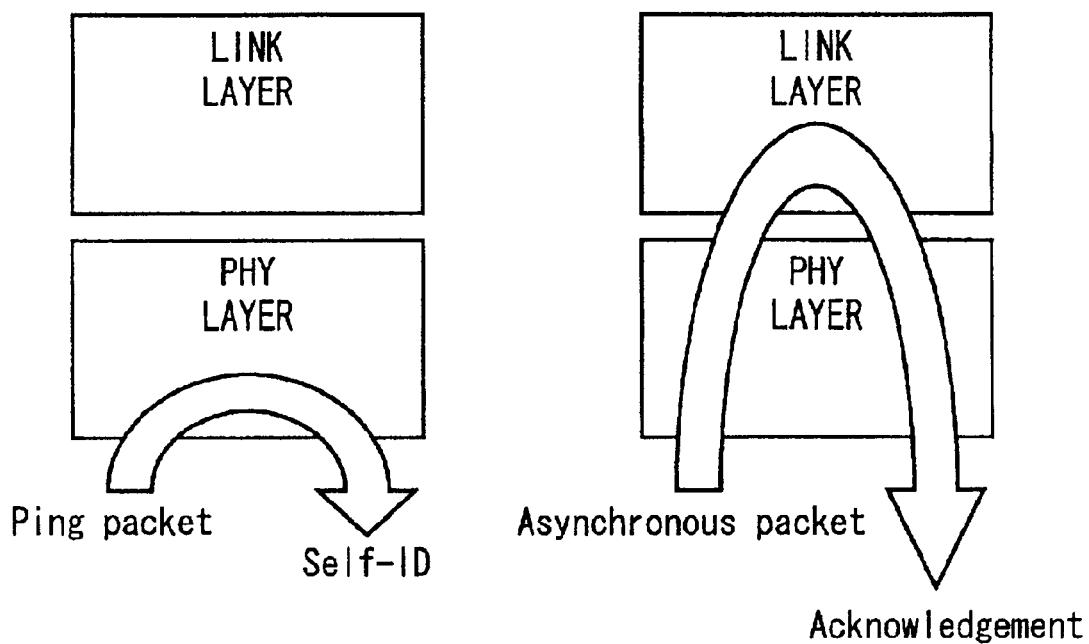
FIG. 41 is a schematic diagram for explaining the response to the packet.

In the above embodiment, the round trip delay max is obtained employing the Ping packet. However, this invention is not limited thereto. The packet for use need not be the Ping packet, so long as the round trip delay max can be obtained at each transfer rate. Since the round trip delay involves no PHY-Link interface, the corresponding response must be processed in the PHY layer as shown on the left side of FIG. 41.

In the above embodiment, the minimum speed is the data transfer rate of S200 or S400 as defined in the IEEE 1394 standards. However, this invention is not limited thereto. Thus, the data transfer efficiency can be increased in accordance with the same procedure at the transfer rate of S800 or more as defined in the p1394.b.

As described above, with the invention, in a data transfer system having devices with different delay times in sending back the data depending on the transfer rate of data, the predetermined data is transferred at the slowest transfer rate within the data transfer system, whereby it is possible to make more effective use of the band for the transfer.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A data transfer system, comprising
a plurality of devices connected in a hierarchical branching arrangement including at least one intermediate device and at least one end device connected to said intermediate device, each of said devices having a different rate for transferring data and a different delay time for sending back data depending on said transfer rate, and
a management apparatus for managing the transfer of said data among said devices, said management apparatus including
transfer rate determining means for determining a slowest transfer rate from among said transfer rates of said devices;
propagation time measuring means for measuring a propagation time between said management apparatus and each of said end devices by transmitting predetermined data to each of said end devices at said slowest transfer rate;
reciprocation time calculating means for calculating a maximum reciprocation time based on said measured propagation times, said maximum reciprocation time indicating the time in which said predetermined data is reciprocated for said end device farthest away from said management apparatus; and
reference value calculating means for calculating a reference value based on said maximum reciprocation time, said reference value being used to calculate a waiting time required when each said device transfers said data.

2. The data transfer system according to claim 1, wherein said devices are connected via an IEEE 1394 high performance serial bus.

3. A data transfer management apparatus for managing the transfer of data in a data transfer system including a plurality of devices, each of the devices having a different rate for transferring the data and a different delay time for sending back data depending on the transfer rate, the devices being connected in a hierarchical branching arrangement including at least one intermediate device and at least one end device connected to the intermediate device, said data transfer management apparatus comprising:

transfer rate determining means for determining a slowest transfer rate from among the transfer rates of the devices;
propagation time measuring means for measuring a propagation time between said data transfer management apparatus and each of the end devices by transmitting predetermined data to each of the end devices at said slowest transfer rate;

reciprocation time calculating means for calculating a maximum reciprocation time based on said measured propagation times, said maximum reciprocation time indicating the time in which said predetermined data is reciprocated for the end device farthest away from said data transfer management apparatus; and reference value calculating means for calculating a reference value based on said maximum reciprocation time, said reference value being used to calculate a waiting time required when each device transfers the data.

4. The data transfer management apparatus according to claim 3, wherein said data transfer management apparatus is connected to each of the devices via an IEEE 1394 high performance serial bus.

5. A method for transferring data in a data transfer system including a plurality of devices and a management apparatus for managing the transfer of data among the devices, the devices being connected in a hierarchical branching arrangement including at least one intermediate device and at least one end device connected to the intermediate device, each of the devices having a different rate for transferring the data and a different delay time for sending back data depending on the transfer rate, the devices being connected in a hierarchical branching arrangement including at least one intermediate device and at least one end device connected to the intermediate device, said data transfer method comprising:

determining a slowest transfer rate from among the transfer rates of the devices;

measuring a propagation time between the management apparatus and each of the end devices by transmitting predetermined data to each of the end devices at the slowest transfer rate;

calculating a maximum reciprocation time based on the measured propagation times, the maximum reciprocation time indicating the time in which the predetermined data is reciprocated for the end device farthest away from the management apparatus; and calculating a reference value based on the maximum reciprocating time, the reference value being used to calculate a waiting time required when each device transfers the data.

6. The data transfer method according to claim 5, wherein the devices are connected via an IEEE 1394 high performance serial bus.

* * * * *

UNITED STATES PATENT AND TRADEMARK OFFICE
CERTIFICATE OF CORRECTION

PATENT NO.    : 6,909,699 B2
DATED         : June 21, 2005
INVENTOR(S)   : Shinya Masunaga, Sumihiro Okawa and Yoshikatsu Niwa It is certified that error appears in the above-identified patent and that said Letters Patent is hereby corrected as shown below:

Column 4,
Line 19, "2Bh" should read -- 2Dh --.

Column 22,
Line 28, "transter" should read -- transfer --.

Signed and Sealed this

Eleventh Day of October, 2005

JON W. DUDAS
*Director of the United States Patent and Trademark Office*